United States Patent
Faccin et al.

(10) Patent No.: US 9,936,428 B2
(45) Date of Patent: Apr. 3, 2018

(54) WIRELESS LOCAL AREA NETWORK OFFLOADING THROUGH RADIO ACCESS NETWORK RULES

(71) Applicant: QUALCOMM Incorporated, San Diego, CA (US)

(72) Inventors: Stefano Faccin, Hayward, CA (US); Haris Zisimopoulos, London (GB); Gavin Bernard Horn, La Jolla, CA (US); Francesco Pica, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 147 days.

(21) Appl. No.: 14/706,539

(22) Filed: May 7, 2015

(65) Prior Publication Data

US 2015/0327129 A1    Nov. 12, 2015

Related U.S. Application Data

(60) Provisional application No. 61/991,383, filed on May 9, 2014.

(51) Int. Cl.
*H04W 36/00*     (2009.01)
*H04W 84/12*     (2009.01)
(Continued)

(52) U.S. Cl.
CPC ... *H04W 36/0055* (2013.01); *H04W 36/0083* (2013.01); *H04W 36/0022* (2013.01);
(Continued)

(58) Field of Classification Search
CPC ......... H04W 36/0055; H04W 36/0083; H04W 36/0022; H04W 36/14; H04W 36/22; H04W 84/12; H04W 88/06
(Continued)

(56) References Cited

U.S. PATENT DOCUMENTS

2014/0206353 A1* 7/2014 Kim .................... H04W 36/14
                                                                455/436
2014/0233386 A1    8/2014 Jamadagni et al.
(Continued)

OTHER PUBLICATIONS

ISA/EPO, International Search Report and Written Opinion of the International Searching Authority, Int'l. App. No. PCT/US2015/029841, dated Nov. 13, 2015, European Patent Office, Rijswijk, NL, 20 pgs.
(Continued)

*Primary Examiner* — Walli Butt
(74) *Attorney, Agent, or Firm* — Holland & Hart LLP

(57) ABSTRACT

Methods, systems, and devices are described for Wireless Local Area Network (WLAN) offloading through radio access network rules. In one embodiment of a method of wireless communication, a mobile device may determine that Radio Access Network (RAN) assistance information is unavailable, the RAN assistance information including a first set of thresholds for switching a Packet Data Network (PDN) connection of the mobile device from a WLAN to a Wireless Wide Area Network (WWAN). The mobile device may further access a second set of thresholds based at least in part on the determining, and the mobile device may determine to switch the PDN connection from the WLAN to the WWAN based at least in part on the second set of thresholds.

15 Claims, 18 Drawing Sheets

(51) Int. Cl.
　　　*H04W 88/06*　　　(2009.01)
　　　*H04W 36/14*　　　(2009.01)
　　　*H04W 36/22*　　　(2009.01)

(52) U.S. Cl.
　　　CPC ............ *H04W 36/14* (2013.01); *H04W 36/22* (2013.01); *H04W 84/12* (2013.01); *H04W 88/06* (2013.01)

(58) Field of Classification Search
　　　USPC ....... 370/230, 235, 236, 237, 312, 328–329, 370/331, 332, 338; 455/436, 437, 435.2
　　　See application file for complete search history.

(56) References Cited

U.S. PATENT DOCUMENTS

| | | | |
|---|---|---|---|
| 2016/0043937 A1 | 2/2016 | Phuyal et al. | |
| 2016/0044550 A1* | 2/2016 | Lee | H04W 36/0066 370/331 |
| 2016/0080998 A1* | 3/2016 | Fukuta | H04W 48/20 370/331 |
| 2016/0095050 A1 | 3/2016 | Lindheimer et al. | |
| 2016/0135100 A1* | 5/2016 | Teyeb | H04W 36/0055 370/331 |
| 2016/0192286 A1* | 6/2016 | Bergstrom | H04W 48/18 370/312 |
| 2016/0219478 A1 | 7/2016 | Huang-Fu et al. | |

OTHER PUBLICATIONS

3GPP, "3rd Generation Partnership Project; Technical Specification Group Radio Access Network; Study on WLAN/3GPP Radio Interworking (Release 12)," 3GPP TR 37.834 v1.1.0 (Sep. 2013), Sep. 2013, pp. 1-16, Technical Report, XP_50769500A, 3rd Generation Partnership Project.

China Telecom et al., "Countering Ping Pong Handover Mobility Solution," SA WG2 Meeting #96, San Diego, California, USA, S2-130978 (revision of S2-13xxxx), Apr. 8-12, 2013, 2 pgs., XP_50708225A, 3rd Generation Partnership Project.

ISA/EPO, Partial Search Report of the International Searching Authority, Int'l App. No. PCT/US2015/029841, dated Sep. 1, 2015, European Patent Office, Rijswijk, NL, 6 pgs.

Qualcomm Incorporated, "Traffic Steering for Solution Without ANDSF," SA WG2 Meeting #103, Phoenix, Arizona, USA, Draft S2-141610 (revision of 52-14xxxx), May 19-24, 2014, pp. 1-5, XP_50902202A, 3rd Generation Partnership Project.

SA2, "LS to RAN WG2 on Availability of RAN Assistance Information," 3GPP TSG-SA2 Meeting #103, Phoenix, USA, Tdoc S2-142199, May 20, 2014, 1 pg., XP_50836640A, 3rd Generation Partnership Project.

Samsung, "Handling CS Services When WLAN Offloading Is Activated," 3GPP TSG SA WG2 Meeting #95, Prague, Czech Republic, TD S2-130138, Jan. 28-Feb. 1, 2013, 2 pgs., XP_50684624A, 3rd Generation Partnership Project.

Zte, "Analysis for Use Cases of Unavailability of RAN Assistance Information," 3GPP TSG RAN WG2 Meeting #87, Dresden, Germany, R2-143112, Aug. 18-22, 2014, pp. 1-4, XP_50794237A, 3rd Generation Partnership Project.

* cited by examiner

WIRELESS LOCAL AREA NETWORK OFFLOADING THROUGH RADIO ACCESS NETWORK RULES

CROSS REFERENCES

The present application for patent claims priority to U.S. Provisional Patent Application No. 61/991,383 by Faccin et al., entitled "Wireless Local Area Network Offloading Through Radio Access Network Rules," filed May 9, 2014, assigned to the assignee hereof, and expressly incorporated by reference herein.

BACKGROUND

The following relates generally to wireless communication, and more specifically to Wireless Local Area Network (WLAN) offloading through Radio Access Network (RAN) rules. Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

Generally, a wireless multiple-access communications system may include a number of access points, each simultaneously supporting communication for multiple mobile devices or user equipment (UE). Different access points may in some cases be associated with different access networks, including Wireless Wide Area Network (WWAN) access networks or WLANs. When a suitable WLAN is available for a UE, it may be desirable to offload one or more Packet Data Network (PDN) connections of the UE from the WWAN to the WLAN in order to reduce the amount of traffic on the WWAN and/or free up bandwidth for other WWAN users. For example, if a UE is consuming a large amount of WWAN bandwidth (e.g., a user is watching a video), it may be desirable to switch the UE to an available WLAN in order to free up spectrum on the WWAN for other users.

In order for a UE to switch one or more PDN connections between the WWAN and the WLAN, the WWAN and/or the WLAN may need to inform the UE which PDN connections are offloadable, and may also need to provide rules and other information to the UE regarding when PDN connections should be offloaded to the WLAN and when they should be switched back to the WWAN. This information may, however, need to be efficiently provided to the UE in order to reduce the overhead signaling for implementing the switching back and forth of the PDN connections between the WLAN and the WWAN.

SUMMARY

The described features generally relate to one or more improved systems, methods, and/or apparatuses for WLAN offloading through RAN rules. When a UE is using a WWAN for one or more PDN connections, the WWAN may, in one embodiment, determine a mode of operation of the UE and, based at least in part on that determination, selectively send or bypass sending an offloadability indicator corresponding to the one or more PDN connections and/or RAN rules and RAN assistance information that may be needed to determine whether and when to switch the one or more PDN connections between the WWAN and WLAN. In another embodiment, the WWAN may always send offloadability indicators corresponding to PDN connections and/or RAN rules and RAN assistance information to the UE, but the UE may only use this information if a certain PDN is offloadable to an available WLAN, and otherwise may store the information for later use. When a UE has offloaded all PDN connections to an available WLAN, the UE may detach from the WWAN, thereby precluding the UE from receiving information needed to determine when a PDN connection should be switched back to the WWAN. Accordingly, in some embodiments, the UE may access alternative information, not contemporaneously provided by the WWAN and not specific to a given UE, for use in determining whether and when to switch one or more PDN connections back to the WWAN. Also, after the UE detaches from the WWAN, one or more methods may be used to cause the UE to camp on a different WWAN relatively soon after detachment in order to reduce the probability of, for example, circuit-switched calls that may be missed if the UE is not attached to any WWAN.

A method of wireless communication is described, with the method including determining, by a mobile device, that Radio Access Network (RAN) assistance information is unavailable, the RAN assistance information comprising a first set of thresholds for switching a packet data network (PDN) connection of the mobile device from a wireless local area network (WLAN) to a wireless wide area network (WWAN). The method also includes accessing a second set of thresholds based at least in part on the determining, and switching the PDN connection of the mobile device from the WLAN to the WWAN based at least in part on the second set of thresholds.

An apparatus for wireless communication is described, with the apparatus including means for determining that Radio Access Network (RAN) assistance information is unavailable, the RAN assistance information comprising a first set of thresholds for switching a packet data network (PDN) connection of the apparatus from a wireless local area network (WLAN) to a wireless wide area network (WWAN). The apparatus also includes means for accessing a second set of thresholds based at least in part on the determining, and means for switching the PDN connection of the apparatus from the WLAN to the WWAN based at least in part on the second set of thresholds.

Another apparatus is described, with the apparatus including a processor and memory in electronic communication with the memory. The memory embodies instructions, with the instructions executable by the processor to determine that Radio Access Network (RAN) assistance information is unavailable, the RAN assistance information comprising a first set of thresholds for switching a packet data network (PDN) connection of the apparatus from a wireless local area network (WLAN) to a wireless wide area network (WWAN), access a second set of thresholds based at least in part on the determining, and switch the PDN connection of the apparatus from the WLAN to the WWAN based at least in part on the second set of thresholds.

A computer program product for communication by a wireless communication apparatus in a wireless communication system is described. The computer program product includes a non-transitory computer-readable medium storing instructions executable by a processor to cause the wireless communication apparatus to determine that Radio Access Network (RAN) assistance information is unavailable, the RAN assistance information comprising a first set of thresholds for switching a packet data network (PDN) connection of the apparatus from a wireless local area network (WLAN) to a wireless wide area network (WWAN), access a second set of thresholds based at least in part on the determining, and switch the PDN connection of the apparatus from the WLAN to the WWAN based at least in part on the second set of thresholds.

In some examples of the method, apparatuses, and/or computer program product described above, the second set of thresholds may include one or more of a connection quality indication (CQI) associated with the WLAN and/or the WWAN, an Internet accessibility indication associated with the WLAN and/or the WWAN, a signal strength indication associated with the WLAN and/or the WWAN, and/or a power level associated with the mobile device. The second set of thresholds may include a mobile device specific set of thresholds that was previously received by the mobile device from the WWAN, wherein the mobile device specific set of thresholds is used in said determining if the mobile device specific set of thresholds has not expired.

In some examples of the method, apparatuses, and/or computer program product described above, the second set of thresholds may include a default set of thresholds preconfigured in the mobile device, and the default set of thresholds may be set to values sufficiently high in order to reduce a likelihood that the mobile device will switch the PDN connection back to the WLAN within a predetermined time period after switching to the WWAN.

In some examples of the method, apparatuses, and/or computer program product described above, the second set of thresholds may include a broadcast set of thresholds provided by the WWAN, the broadcast set of thresholds being unspecific to the mobile device, and the method may further include receiving the broadcast set of thresholds via a system information block (SIB) form the WWAN.

In some examples of the method, apparatuses, and/or computer program product described above, the method may further include receiving an indication instructing the mobile device to camp on a Radio Access Technology (RAT) associated with the WWAN if all PDN connections are offloaded to the WLAN and a cellular radio of the mobile device is in idle mode, and the indication may include a RAT/Frequency Selection Priority (RFSP) index value prioritizing connection of the mobile device to the RAT. The RAT may be one of GERAN or UTRAN in order to reduce a probability of missing a circuit switched (CS) call at the mobile device, or the RAT may be UTRAN in order to allow the mobile device to continue receiving RAN assistance information related to the WWAN.

A method for wireless communication is described, with the method including receiving, at a mobile device, an offloadability indicator corresponding to a packet data network (PDN) connection of the mobile device, the offloadability indicator being received irrespective of a mode of operation of the mobile device, utilizing the offloadability indicator to determine whether to offload the PDN connection from a wireless wide area network (WWAN) to a wireless local area network (WLAN), the offloadability indicator being utilized when the mobile device receives radio access network (RAN) assistance information or when the mobile device has access to a set of thresholds related to offloading the PDN connection from the WWAN to the WLAN, and disregarding the offloadability indicator when the mobile device is not receiving RAN assistance information or when the mobile device does not have access to a set of thresholds for use in making an offloading determination.

An apparatus for wireless communications is described, with the apparatus including means for receiving an offloadability indicator corresponding to a packet data network (PDN) connection of the apparatus, the offloadability indicator being received irrespective of a mode of operation of the apparatus, means for utilizing the offloadability indicator to determine whether to offload the PDN connection from a wireless wide area network (WWAN) to a wireless local area network (WLAN), the offloadability indicator being utilized when the apparatus receives radio access network (RAN) assistance information or when the apparatus has access to a set of thresholds related to offloading the PDN connection from the WWAN to the WLAN, and means for disregarding the offloadability indicator when the apparatus is not receiving RAN assistance information or when the apparatus does not have access to a set of thresholds for use in making an offloading determination.

Another apparatus is described, with the apparatus comprising a processor and memory in electronic communication with the processor. The memory embodies instructions, the instructions being executable by the processor to receive an offloadability indicator corresponding to a packet data network (PDN) connection of the apparatus, the offloadability indicator being received irrespective of a mode of operation of the apparatus, utilize the offloadability indicator to determine whether to offload the PDN connection from a wireless wide area network (WWAN) to a wireless local area network (WLAN), the offloadability indicator being utilized when the apparatus receives radio access network (RAN) assistance information or when the apparatus has access to a set of thresholds related to offloading the PDN connection from the WWAN to the WLAN, and disregard the offloadability indicator when the apparatus is not receiving RAN assistance information or when the apparatus does not have access to a set of thresholds for use in making an offloading determination.

A computer program product for communication by a wireless communication apparatus in a wireless communication system is described. The computer program product includes a non-transitory computer-readable medium storing instructions executable by a processor to cause the wireless communication apparatus to receive an offloadability indicator corresponding to a packet data network (PDN) connection of the apparatus, the offloadability indicator being received irrespective of a mode of operation of the apparatus, utilize the offloadability indicator to determine whether to offload the PDN connection from a wireless wide area network (WWAN) to a wireless local area network (WLAN), the offloadability indicator being utilized when the apparatus receives radio access network (RAN) assistance information or when the apparatus has access to a set of thresholds related to offloading the PDN connection from the WWAN to the WLAN, and disregard the offloadability indicator when the apparatus is not receiving RAN assistance information or when the apparatus does not have access to a set of thresholds for use in making an offloading determination.

In some examples of the method, apparatuses, and/or computer program product described above, the method may further include storing the offloadability indicator for later use even if the mobile device is not receiving RAN assistance information and/or does not have access to any thresholds for use in making the offloading determination, and further may include utilizing the offloadability indicator to determine whether to offload the PDN connection to the WLAN when the mobile device switches to a new RAT associated with the WWAN that does provide RAN assistance information to the mobile device.

In some examples of the method, apparatuses, and/or computer program product described above, the offloadability indicator may be specific to a RAT over which the offloadability indicator was received, in which case the method may further include receiving an updated offloadability indicator corresponding to a different RAT when the mobile device switches to the different RAT. In some examples of the method, apparatuses, and/or computer program product described above, the offloadability indicator may be generic to a plurality of RATs and is received over a first RAT of the plurality of RATs, in which case the mobile device may not receive a new offloadability indicator upon switching to a second RAT of the plurality of RATs. The method may further include storing the offloadability indicator for later use, even if the first RAT does not provide RAN assistance information.

A method for wireless communication is described, with the method including determining a mode of operation of a mobile device, and sending an offloadability indicator corresponding to a packet data network (PDN) connection based at least in part on the determination.

An apparatus for wireless communication is described, with the apparatus including means for determining a mode of operation of a mobile device, and means for sending an offloadability indicator corresponding to a packet data network (PDN) connection based at least in part on the determination.

Another apparatus is described, with the apparatus comprising a processor and memory in electronic communication with the processor. The memory embodies instructions, the instructions being executable by the processor to determine a mode of operation of a mobile device, and send an offloadability indicator corresponding to a packet data network (PDN) connection based at least in part on the determination.

A computer program product for communication by a wireless communication apparatus in a wireless communication system is described. The computer program product includes a non-transitory computer-readable medium storing instructions executable by a processor to cause the wireless communication apparatus to determine a mode of operation of a mobile device, and send an offloadability indicator corresponding to a packet data network (PDN) connection based at least in part on the determination.

In some examples of the method, apparatuses, and/or computer program product described above, the offloadability indicator may be sent to the mobile device when the mobile device is in a mode in which WLAN offloading is permitted and/or the offloadability indicator may be selectively sent to a Radio Network Controller (RNC) when the mobile device is in an Iu mode of operation. Further, in some examples of the method, apparatuses, and/or computer program product described above, the sending of the offloadability indicator may be bypassed when the mobile device is in a mode in which WLAN offloading is not permitted, such as when the mobile device is in an A/Gb mode of operation. Also, said determining may be performed by a Serving General Packet Radio Service Support Node (SGSN).

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Features generally relating to one or more improved systems, methods, and/or apparatuses for offloading one or more PDN connections to a WLAN are described. When a UE has one or more PDN connections with a WWAN, the WWAN may, in one embodiment, determine a mode of operation of the UE and, based at least in part on that determination, selectively send or bypass sending an offloadability indicator corresponding to the one or more PDN connections and/or RAN rules and RAN assistance information that may be needed to determine whether and when to switch the one or more PDN connections between the WWAN and WLAN. In another embodiment, the WWAN may always send offloadability indicators corresponding to PDN connections and/or RAN rules and RAN assistance information to the UE, but the UE may only use this information if a certain PDN is offloadable and/or if a suitable WLAN is available, and otherwise may store the information for later use. If a UE offloads all PDN connections to a WLAN, the UE may detach from the WWAN, which might preclude the UE from receiving information needed to determine when a PDN connection should be switched back to the WWAN. Accordingly, in some embodiments, the UE may access alternative information, not contemporaneously provided by the WWAN or not specific to the UE, for use in determining whether and when to switch one or more PDN connections back to the WWAN. Also, after the UE detaches from the WWAN, one or more policies may encourage or cause the UE to camp on a different WWAN relatively soon after detachment in order to reduce the probability of, for example, circuit-switched calls that may be missed if the UE is not attached to any WWAN.

Thus, the following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Figure 1:
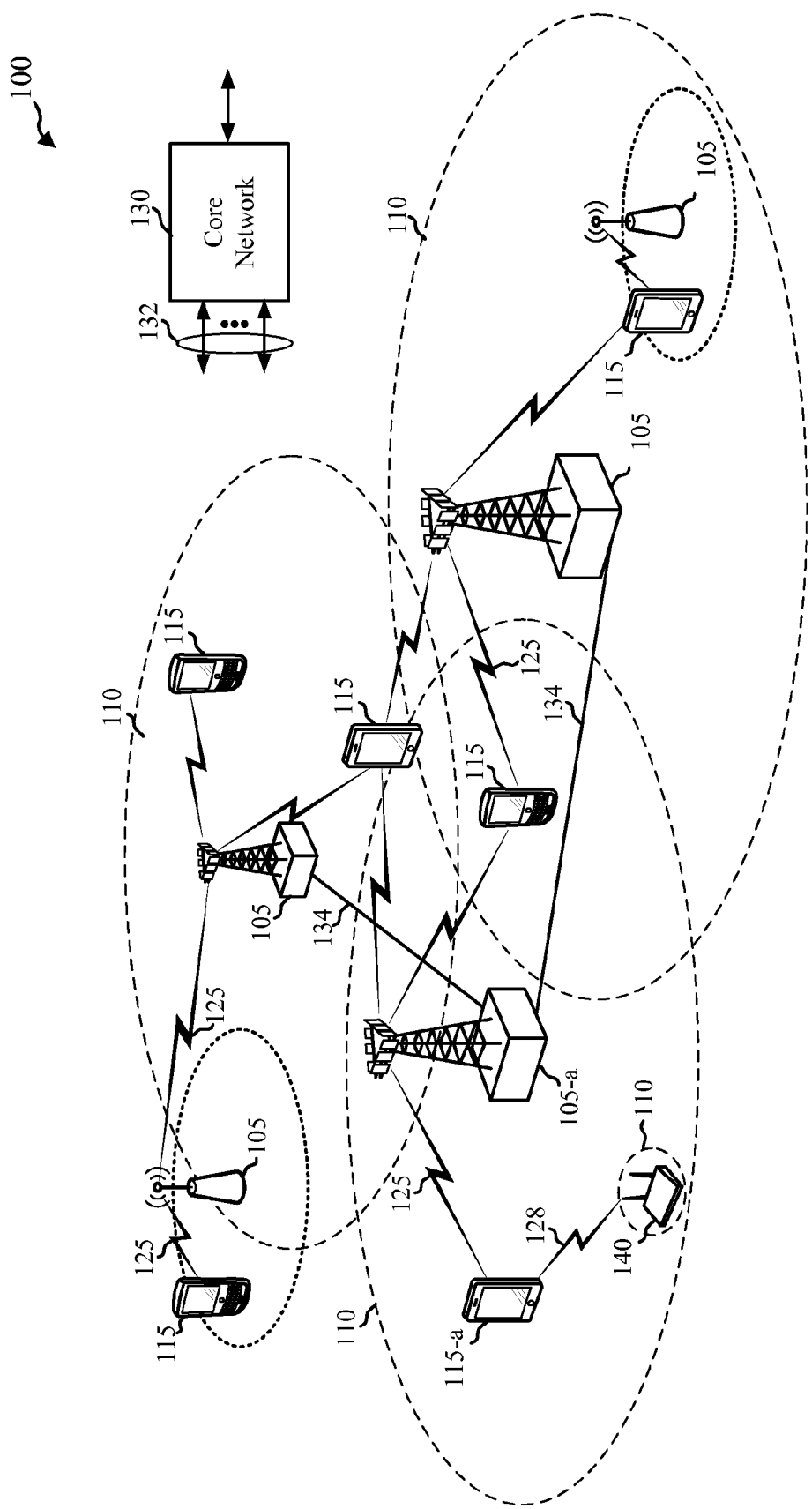
FIG. 1 shows a first block diagram of a wireless communications system in accordance with various embodiments.

Referring first to FIG. 1, a diagram illustrates an example of a wireless communications system 100. The wireless communications system 100 includes a plurality of access points such as base stations 105 (which may be eNBs, NBs, etc.) and WLAN access points 140, a number of mobile devices such as user equipments (UEs) 115, and a core network 130. Some of the access points 105, 140 may communicate with the UEs 115 under the control of a base station controller (not shown), which may be part of the core network 130 or certain access points in various examples. Some of the access points 105, 140 may communicate control information and/or user data with the core network 130 through backhaul links 132. In some examples, some of the access points 105, 140 may communicate, either directly or indirectly, with each other over backhaul links 134, which may be wired or wireless communication links. The wireless communications system 100 may support operation on multiple carriers (waveform signals of different frequencies). Multi-carrier transmitters can transmit modulated signals simultaneously on the multiple carriers. For example, each communication link 125, 128 may be a multi-carrier signal modulated according to various radio technologies. Each modulated signal may be sent on a different carrier and may carry control information (e.g., reference signals, control channels, etc.), overhead information, data, etc.

The access points 105, 140 may wirelessly communicate with the UEs 115 via one or more access point antennas. Each of the access points 105, 140 may provide communication coverage for a respective geographic coverage area 110. Some access points may provide access to one or more WWANs, and these access points may be referred to as base stations 105, including base transceiver stations (BTS), radio base stations, radio transceivers, basic service sets (BSS), extended service sets (ESS), NodeBs, evolved NodeBs (eNBs), Home NodeBs, Home eNodeBs, and so forth. In some embodiments, each such base station 105 may provide access to one or more Radio Access Technologies (RATs) associated with a WWAN. Other access points 140 may provide access to one or more WLANs, and these access points may be referred to as WLAN access points 140, including WiFi routers and the like. In some embodiments, each WLAN access point 140 may provide access to one or more RATs associated with a WLAN. Generally speaking, a WLAN may have a smaller geographic coverage area 110 than a WWAN. For example, a WLAN's geographic coverage area may extend ten meters to one hundred meters from the WLAN access point 140, whereas a WWAN's geographic coverage area may extend thousands of meters from a base station 105. The coverage areas of different access points 105, 140 including the coverage areas of the same or different types of access points 105, 140 utilizing the same or different radio technologies, and/or belonging to the same or different access networks, may overlap.

In some examples, the wireless communications system 100 may include an LTE/LTE-A communications system or network. In LTE/LTE-A communications systems, the term evolved Node B (eNB) may be generally used to describe the access points 105. The wireless communications system 100 may also be a Heterogeneous LTE/LTE-A network in which different types of eNBs provide coverage for various geographical regions. For example, each eNB 105 may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells.

The core network 130 may communicate with the access points 105, 140 via a backhaul link 132 (e.g., S1, etc.). The access points 105, 140 may also communicate with one another, e.g., directly or indirectly via backhaul links 134 (e.g., X2, etc.) and/or via backhaul links 132 (e.g., through core network 130). The wireless communications system 100 may support synchronous or asynchronous operation. For synchronous operation, the access points may have similar frame timing, and transmissions from different access points may be approximately aligned in time. For asynchronous operation, the access points may have different frame timing, and transmissions from different access points may not be aligned in time. The techniques described herein may be used for either synchronous or asynchronous operations.

The UEs 115 may be dispersed throughout the wireless communications system 100, and each UE 115 may be stationary or mobile. A UE 115 may also be referred to by those skilled in the art as a mobile device, a mobile station, a subscriber station, a mobile unit, a subscriber unit, a wireless unit, a remote unit, a wireless device, a wireless communication device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a handheld device, a tablet computer, a laptop computer, a cordless phone, a wireless local loop (WLL) station, or the like. A UE may be able to communicate with macro eNBs, pico eNBs, femto eNBs, relays, and the like. A UE may also be able to communicate over different access networks, such as cellular or other WWANs or WLANs.

Taking the UE 115-a in FIG. 1 as an example, the communication link 125 to the base station 105-a may include an uplink for carrying uplink (UL) transmissions (e.g., from UE 115-a to access point 105-a) and/or a downlink for carrying downlink (DL) transmissions (e.g., from access point 105-a to UE 115-a). The UL transmissions may also be called reverse link transmissions, while the DL transmissions may also be called forward link transmissions. The communication link 128 from UE 115-a to the WLAN access point 140 may similarly include an uplink and/or a downlink.

The UEs 115 may in some embodiments simultaneously communicate with more than one access point, including more than one different types of access points. In some embodiments, a UE 115 such as the UE 115-a may manage data connectivity at the UE 115-a by determining that some or all traffic of one or more PDN connections of the UE can or should be offloaded to a WLAN (e.g., to the WLAN AP 140), and refraining from transmitting and receiving data over WWAN PDN connections (e.g., PDN connections with the eNB 105-a). In response to detecting a triggering event, the UE 115-a may thereafter re-establish one or more PDN connections with an available WWAN. The management of data connectivity at the UEs 115 is described in further detail below.

In systems, such as system 100, in which PDN connections can be offloaded from a WWAN to a WLAN, and optionally can be switched back to the WWAN, there are a number of aspects of such transfers that may or may not need to be considered. For example, it may be important for carriers using Circuit Switched Fall Back (CSFB) over LTE to be sure that a UE does not detach from an LTE connection when PDN connections are offloaded to WLAN—otherwise CSFB may not be available anymore. As another example, LTE RAN assistance information may only be available to the UE if the UE remains attached to an LTE connection. When attached to a UTRAN connection, a UE may only receive 3G RAN assistance information that is not useful for steering traffic back to an LTE connection. In some cases, no RAN assistance may be provided over a GERAN connection due to its semi-legacy status among the various RATs. Also, in some instances, NAS signaling may be used to send an offloadability indicator to a UE regardless of whether a PDN is offloadable or not—and this offloadability indicator may only be meaningful when the UE operates in certain modes of operation, but not in others. Still further, in some instances, an SGSN may need to send an indicator from the SGSN to RAN in the UE context, e.g., to allow the RNC to determine to which UE to send the RAN assistance in unicast RRC. If the UE does not receive RAN assistance information in a GERAN connection, the SGSN may only send the information to an RNC, but not to the BSC in some embodiments. Still further, in some instances, an Access Network Discovery and Selection Function (ANDSF) may not be available to provide information relating to the offloading of PDN connections, and instead an operator may need to rely on RAN signaling to communicate offloadability information. These considerations may only be applicable in certain implementations, and they should not be read to be requirements of the appended claims.

Figure 2:
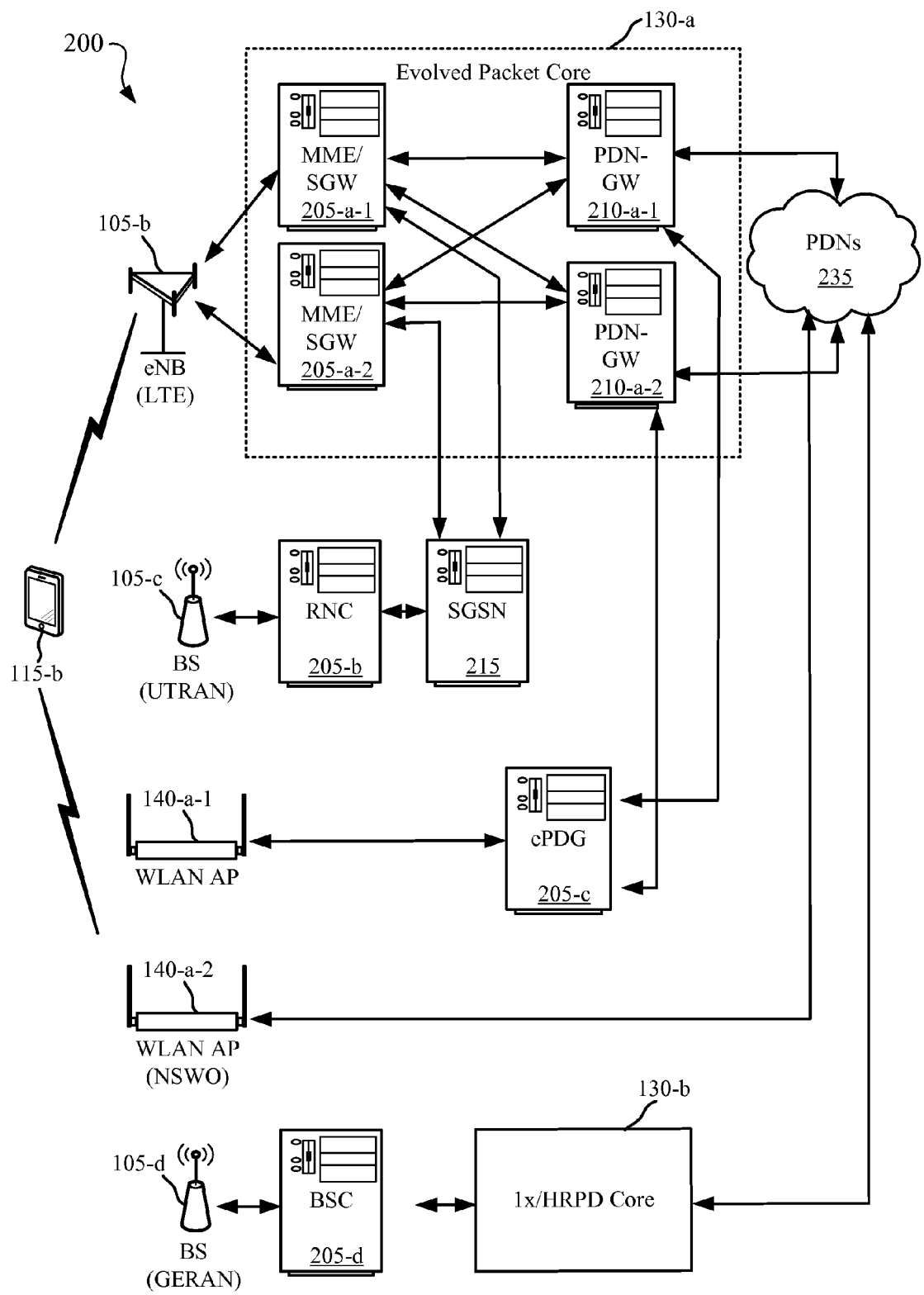
FIG. 2 shows a second block diagram of a wireless communications system in accordance with various embodiments.

Referring now to FIG. 2, a wireless communications system 200 is shown. The wireless communications system 200 includes a UE 115-b, an enhanced packet core (EPC) 130-a, a 1×/HRPD packet core 130-b, as well as a number of access points 105, 140, a number of controllers 205, a number of gateways 210, and a number of PDNs 235. Some of the access points may include a base station 105, such as an eNB base station 105-b associated with an LTE access network, a base station 105-c associated with a UTRAN, a base station 105-d associated with a GERAN, a WLAN access point 140-a-1 associated with a first WLAN, a WLAN access point 105-a-2 associated with a second WLAN, and so forth.

The enhanced packet core 130-a may include a number of devices 205-a implementing Mobile Management Entities (MMEs) and Serving Gateways (SGWs). Alternatively, one or more of the MMEs and SGWs may be implemented in separate devices. The SGWs may, in turn, be in communication with one or more Packet Data Network Gateways (PDN-GWs) 210-a-1, 210-a-2. Each of the PDN-GWs 210-a-1, 210-a-2 may be in communication with one or more PDNs 235.

The eNB 105-a-1 may access the EPC 130-a through a direct connection to the MME/SGW devices 205-a. The UTRAN BS 105-c may be in communication with a Radio Network Controller (RNC) 205-b, which in turn may communicate with a Serving GPRS Support Node (SGSN) 215 to access the EPC 130-a through MME/SGs 205-a. The first WLAN access point 140-a-1 may communicate with an evolved Packet Data Gateway (ePDG) 205-d, which may provide access to the EPC 130-a through the PDN-GWs 210-a. The second WLAN AP 140-a-2 may bypass the EPC 130-a and may communicate directly with the PDNs 235 through direct IP addressing. The GERAN BS 105-d may be in communication with a BSC 205-e, which may be in communication with a core network 130-b (e.g., a 1×/HRPD core network). The core network 130-b may be in communication with one or more of the PDNs 235.

Each of the eNB 105-b, UTRAN BS 105-c, and GERAN BS 105-d may provide access to a WWAN, whereas each of the WLAN APs 140-a-1, 140-a-2 may provide access to a WLAN. The eNB 105-a-1 may provide access to an LTE WWAN, whereas the UTRAN BS 105-c and GERAN BS 105-d may provide access to non-LTE WWANs.

In some embodiments, a UE 115 such as the UE 115-b may establish PDN connections with more than one of the eNB 105-b, UTRAN BS 105-c, GERAN BS 105-d WLAN AP 140-a-1, WLAN AP 140-a-2, and/or other access points (e.g., the UE 115-b may support multi-access PDN connectivity (MAPCON)). PDN connections over different access networks may be established using different Access Point Names (APNs). In some embodiments, a UE 115 may establish or maintain PDN connections with more than one access point simultaneously.

A UE 115 such as the UE 115-*b* may have preferences for accessing access networks to establish data connectivity. The preferences may be based on network operator policies. Using the preferences, the UE 115-*b* may establish data connectivity over one or more available networks to maintain data connectivity.

Figure 3:
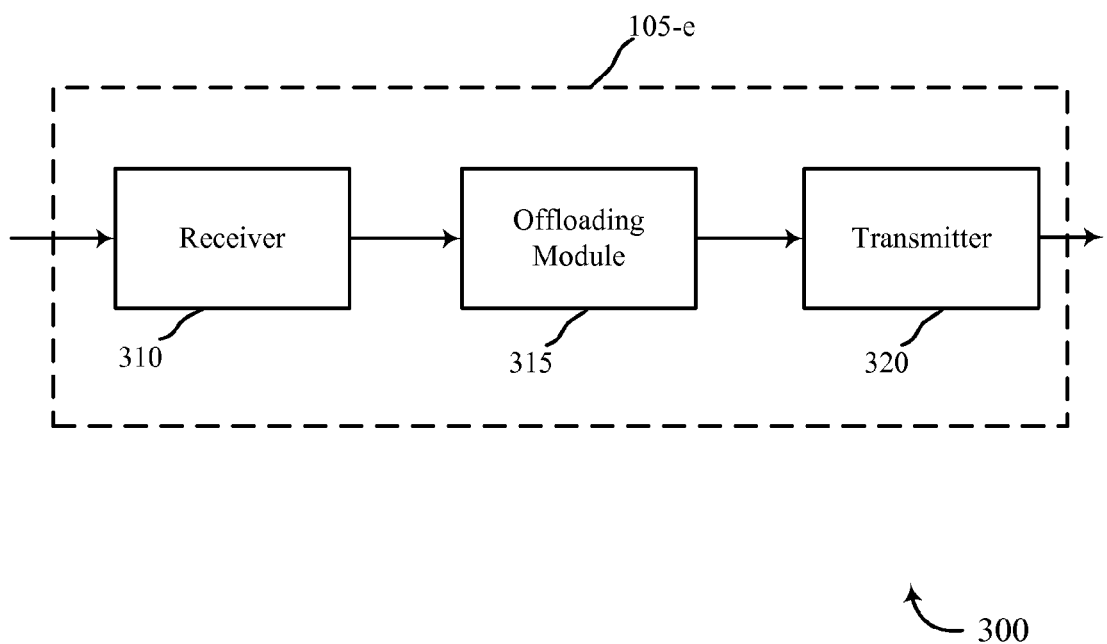
FIG. 3 shows a block diagram of a base station for use in offloading one or more PDN connections in accordance with various embodiments.

FIG. 3 shows a block diagram 300 of a base station 105-*e* for use in offloading one or more PDN connections to a WLAN in accordance with various embodiments. The base station 105-*e* in FIG. 3 may be, for example, one of the base stations 105, 105-*a*, 105-*b*, 105-*c*, 105-*d* shown in FIGS. 1 and 2. The base station 105-*e* shown in FIG. 3 includes a receiver 310, an offloading module 315, and a transmitter 320. The base station 105-*e* may also include a processor. Each of these components may be in communication with each other.

The components of the base station 105-*e* may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The receiver 310 may receive information such as packets, user data, and/or control information associated with various information channels (e.g., control channels, data channels, etc.). Information may be passed on to the offloading module 315, and to other components of the base station 105-*e*. For example, the receiver 310 may receive information regarding when and which PDN connections with various UEs should be offloaded to an available WLAN.

The offloading module 315 may be configured to provide offloading information related to one or more PDN connections of one or more UEs 115. For example, the offloading module 315 may be configured to provide an offloadability indicator for each PDN connection of each UE 115 that indicates whether that PDN connection can be offloaded to a WLAN if available. The offloading module may also be configured to provide RAN rules and RAN assistance information related to possible offloading of PDN connections to WLAN and the reswitching of these PDN connections back to a WWAN associated with the base station 105-*e*.

The transmitter 320 may transmit one or more signals received from other components of the base station 105-*e*. For example, the transmitter 320 may transmit offloadability indicators corresponding to specific PDN connections to one or more UEs using NAS signaling. In some embodiments, the offloadability indicators may be sent to the UEs from the EPC 130-*a*, with the determination of whether a specific PDN should or should not be offloadable being made by one or more of an MME 205-*a*, an SGSN 215, a Policy and Charging Rules Function (PCRF), etc.

The transmitter 320 may also transmit RAN rules and RAN assistance information to the UEs. RAN rules may be a set of conditions under which a PDN connection should be offloaded from a WWAN to a WLAN and/or switched back to the WWAN. For example, one RAN rule may be that if a suitable WLAN signal is available, then a PDN connection should generally be offloaded to that WLAN. Another rule may be that if a WLAN signal strength is weak, but a suitably strong WWAN signal is available, a PDN connection currently being serviced through the WLAN should be switched back to the WWAN. In some embodiments, RAN rules may cover the mobility of a PDN connection to both the EPC 130-*a* (i.e., in a PDN connection handover) and to a direct IP connection via a Non-Seamless WLAN Offload (NSWO).

RAN assistance information may include thresholds as to when these transfers should happen. It will be appreciated that different access points may have different thresholds at which one or more PDN connections should be maintained or transferred to another access point. Therefore, whereas RAN rules define the general set of conditions under which such transfers should take place, the RAN assistance information is specific to a base station and UE that has established or will establish a PDN connection. In some embodiments, the transmitter 320 may be co-located with the receiver 310 in a transceiver module. The transmitter may transmit packets and information over one or more wireless protocols—for example, LTE, WiFi, DSRC, and so forth.

Still referring to FIG. 3, in some embodiments the base station 105-*e* (e.g., the offloading module 315 or, alternatively, the SGSN 215) may be configured to determine a mode of operation of a UE 115, and, based at least in part on the determination, send an offloadability indicator described above that corresponds to a specific PDN connection. For example, in some embodiments, the offloadability indicator may be sent to the UE 115 only when the UE 115 is operating in a mode in which WLAN offloading is permitted (e.g., when the UE is in an Iu or LTE mode of operation). If, for example, the UE is in the Iu mode of operation and connected to a UTRAN BS 105-*c*, the offloadability indicator may be provided to the RNC 205-*b* shown in FIG. 2. The RNC and UTRAN BS 105-*c* may utilize the received indicator to determine whether to send RAN rules and/or RAN assistance information to a UE 115. In alternative embodiments, the offloadability indicator may be provided to the UE 115 for immediate use and/or to be stored for later use. The sending of the offloadability indicator may, however, be bypassed if the UE 115 is in a mode in which WLAN offloading is not permitted—such as if the UE 115 is an A/GB mode of operation with a GERAN BS 105-*d*.

Figure 4:
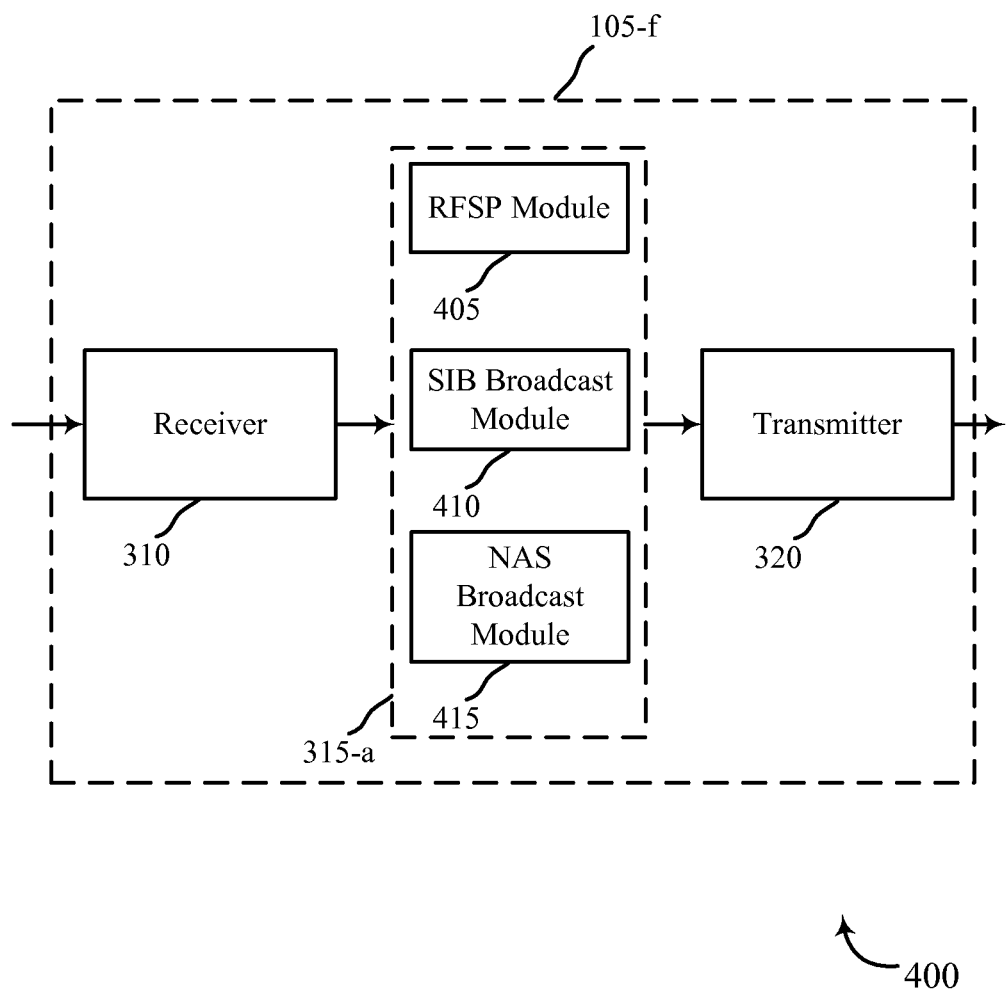
FIG. 4 shows a block diagram of a base station for use in offloading one or more PDN connections in accordance with various embodiments.

FIG. 4 shows a block diagram 400 of a base station 105-*f* for use in offloading one or more PDN connections to a WLAN in accordance with various embodiments. The base station 105-*f* may be, for example, one of the base stations 105, 105-*a*, 105-*b*, 105-*c*, 105-*d*, 105-*e* shown in FIGS. 1-3, and may be an example of one or more aspects of the base station 105-*e* described with reference to FIG. 2. The base station 105-*f* shown in FIG. 3 includes a receiver 310, an offloading module 315-*a*, and a transmitter 320. The base station 105-*f* may also include a processor. Each of these components may be in communication with each other. The offloading module 315-*a* in FIG. 4 includes an RFSP module 405, a SIB broadcast module 410, and a NAS broadcast module 415.

The components of the base station 105-*f* may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The receiver 310 may receive information such as packets, user data, and/or control information associated with various information channels (e.g., control channels, data channels, etc.), as described above with reference to FIG. 3. Information may be passed on to the offloading module 315-a, and to other components of the base station 105-f. The offloading module 315-a may be configured to perform the operations described above with reference to the offloading module 315 shown in FIG. 3. The transmitter 320 may transmit the one or more signals received from other components of the base station 105-f, as described above with reference to FIG. 3.

The RFSP module 405, the SIB broadcast module 410, and the NAS broadcast module 415 may all be configured to receive, provide, and/or analyze information related to the connection of various UEs to a WWAN associated with the base station 105-f and/or their connection to a WLAN AP 140. The RFSP module 405, for example, may provide RAN/Frequency Selection Priority index information, which may prioritize the connection of a UE 115 to a specific Radio Access Technology (RAT), such as GERAN, UTRAN, or LTE. In one embodiment, for example, the RFSP module 405 may be configured to provide an indication to a UE 115 (through the transmitter 320) to camp on a RAT associated with the WWAN of the base station 105-f if all PDN connections are offloaded to a WLAN and a cellular radio of the UE is thereby placed in idle mode. This may prevent the UE 115 from unsuccessfully trying to connect to a specific RAT, such as LTE, many times over, and instead may cause the UE to reattach to a GERAN/UTRAN connection as fast as possible so as to reduce the likelihood of missing, for example, a CSFB incoming call. The RFSP module 405 may thus consider not only conventional factors in creating the RFSP index, but may also consider the offloading of PDN connections—specifically, the RFSP index may be such that camping on UTRAN and/or GERAN is forced if a UE 115 offloads all PDN connections to a WLAN or not. In another embodiment, the UE 115 may read the RAN assistance information before making a decision to reconnect to the cellular network. Reading the RAN assistance information before reconnection may prevent ping ponging between WLAN and the cellular network after having offloaded all of the traffic to the WLAN.

The SIB broadcast module 410 may be configured to provide offloading information in the SIB broadcast message for the base station 105-f—such as generalized RAN assistance thresholds. These generalized thresholds may not be specific to individual UEs 115, but may be used by certain UEs 115 if the UEs are not connected to a specific WWAN. The NAS broadcast module 415 may also be configured to provide offloading information through NAS signaling. For example, the NAS broadcast module 415 may provide offloadability indicators (e.g., to individual UEs 115) regarding whether each active PDN connection can be offloaded to a WLAN or not.

Figure 5:
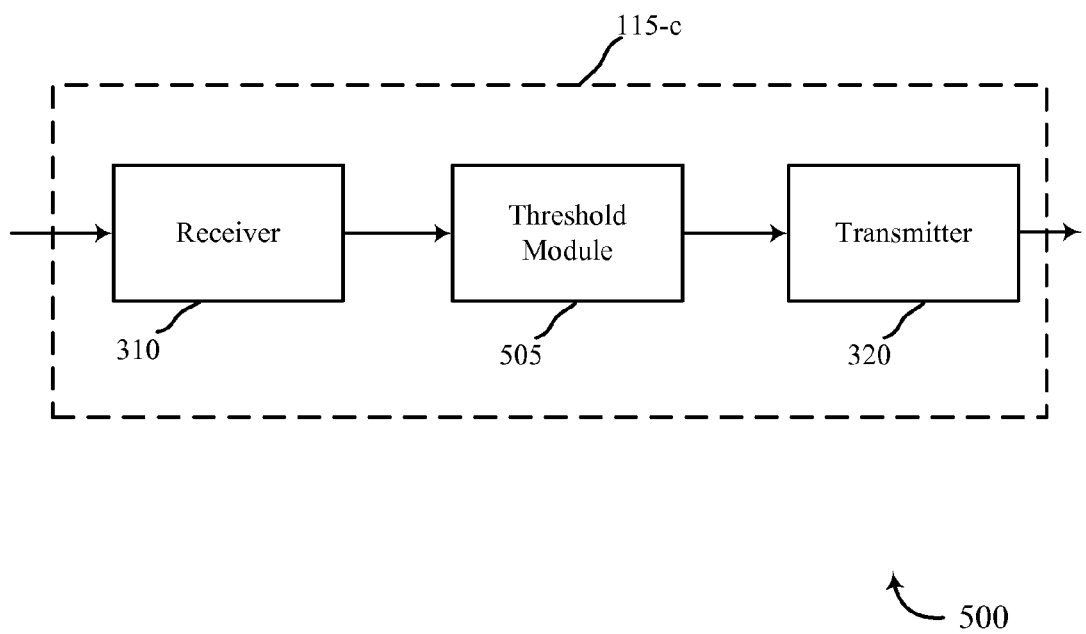
FIG. 5 shows a block diagram of a UE for use in offloading one or more PDN connections in accordance with various embodiments.

FIG. 5 shows a block diagram 500 of a UE 115-c that may offload one or more PDN connections to a WLAN in accordance with various embodiments. The UE 115-c in FIG. 5 may be, for example, one of the UEs 115, 115-a, 115-b shown in FIGS. 1 and 2. The UE 115-c shown in FIG. 5 includes a receiver 310, a threshold module 505, and a transmitter 320. The UE 115-c may also include a processor.

Each of these components may be in communication with each other. In some embodiments, the UE 115-c may support Voice Over LTE (VoLTE), whereas in other embodiments, the UE 115-c may only support Circuit Switched (CS) or Circuit Switched Fall Back (CSFB) calls.

The components of the UE 115-c may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The receiver 310 may receive information such as packets, user data, and/or control information associated with various information channels (e.g., control channels, data channels, etc.). Information may be passed on to the threshold module 505, and to other components of the UE 115-c. In some embodiments, the receiver 310 may receive offloadability indicators, RAN rules, and/or RAN assistance information relating to the offloadability of one or more active PDN connections that the UE 115-c has with either a base station 105 or a WLAN AP 140. In one example, the receiver 310 may receive an indication (e.g., originating from the RFSP module 405 in FIG. 4) instructing the UE 115-c to camp on a certain RAT associated with a WWAN of a base station 105 if all PDN connections are offloaded to an available WLAN and a cellular radio of the UE is put into an idle mode. As mentioned above, this indication may prioritize connection of the UE to a specific RAT—for example, the indication may prioritize a GERAN or UTRAN connection in order to reduce the probability of the UE 115-c missing a telephone call over a CSFB connection, or any other circuit switched information. Alternatively, the indication may prioritize a UTRAN connection in order to allow the UE 115-c to continue receiving RAN assistance information related to a WWAN of a base station 105 (if, for example, such RAN assistance information is not provided over a GERAN RAT).

The threshold module 505 may be configured to receive, provide, and/or analyze offloadability indicators, RAN rules, and/or RAN assistance information (such as thresholds) and to determine whether and when to switch certain PDN connections between a WWAN and a WLAN available to the UE 115-c. In those cases with at least one active PDN connection with a WWAN, the threshold module 505 may receive current and UE 115-c specific RAN assistance information from the base station 105 associated with the WWAN, and make the determination of whether certain PDN connections should be switched to either the WLAN or back to the WWAN based on this current and UE-specific information. In other embodiments, however (many of which are described below), the UE 115-c may not have access to current, UE-specific information, such as RAN assistance information. This may be the case if, for example, all PDN connections of the UE 115-c have been offloaded to a WLAN AP 140, or if the only remaining PDN connection of the UE 115-c is on a GERAN RAT, which may not provide RAN assistance information to the UE 115-c. In these situations, the UE 115-c may have access to alternative information that may be utilized to make determinations related to the offloading of one or more PDN connections. For example, the UE 115-c may utilize the last set of assistance information received.

For example, and still referring to FIG. 5, in one embodiment, the threshold module 505 of the UE 115-c may determine that RAN assistance information is unavailable, where the RAN assistance information includes a first set of thresholds for switching a PDN connection of the UE from a WLAN back to a WWAN. The threshold module 505 may access a second, alternative set of thresholds, based at least in part on the determination that no current, UE 115-c specific RAN assistance information is available. The threshold module 505 may then determine whether or not to switch the PDN connection of the UE 115-c from the WLAN back to the WWAN based at least in part on the second set of thresholds.

Still referring to FIG. 5, in one embodiment, the UE 115-c may receive an offloadability indicator corresponding to a PDN connection of the mobile device, the offloadability indicator being received irrespective of a mode of operation of the UE 115-c. The UE 115-c (e.g., the threshold module 505) may utilize the received offloadability indicator to determine whether to offload the PDN connection from a WWAN to a WLAN if and when the UE 115-c is currently receiving RAN assistance information or when the UE 115-c has access to a set of thresholds for use in making an offloading determination. If, however, the UE 115-c is not contemporaneously receiving RAN assistance information and/or does not have access to a set of thresholds for use in making an offloadability determination, the UE 115-c may disregard the received offloadability indicator. The UE 115-c may use the received offloadability indicator(s), together with the received RAN rules and RAN assistance information (e.g., thresholds) in determining whether a PDN connection should be offloaded to a WLAN, or maintained/switched back to a WWAN.

The transmitter 320 may transmit one or more signals received from other components of the UE 115-c. For example, the transmitter 320 may transmit data on an uplink connection to an access point 105, 140.

Figure 6:
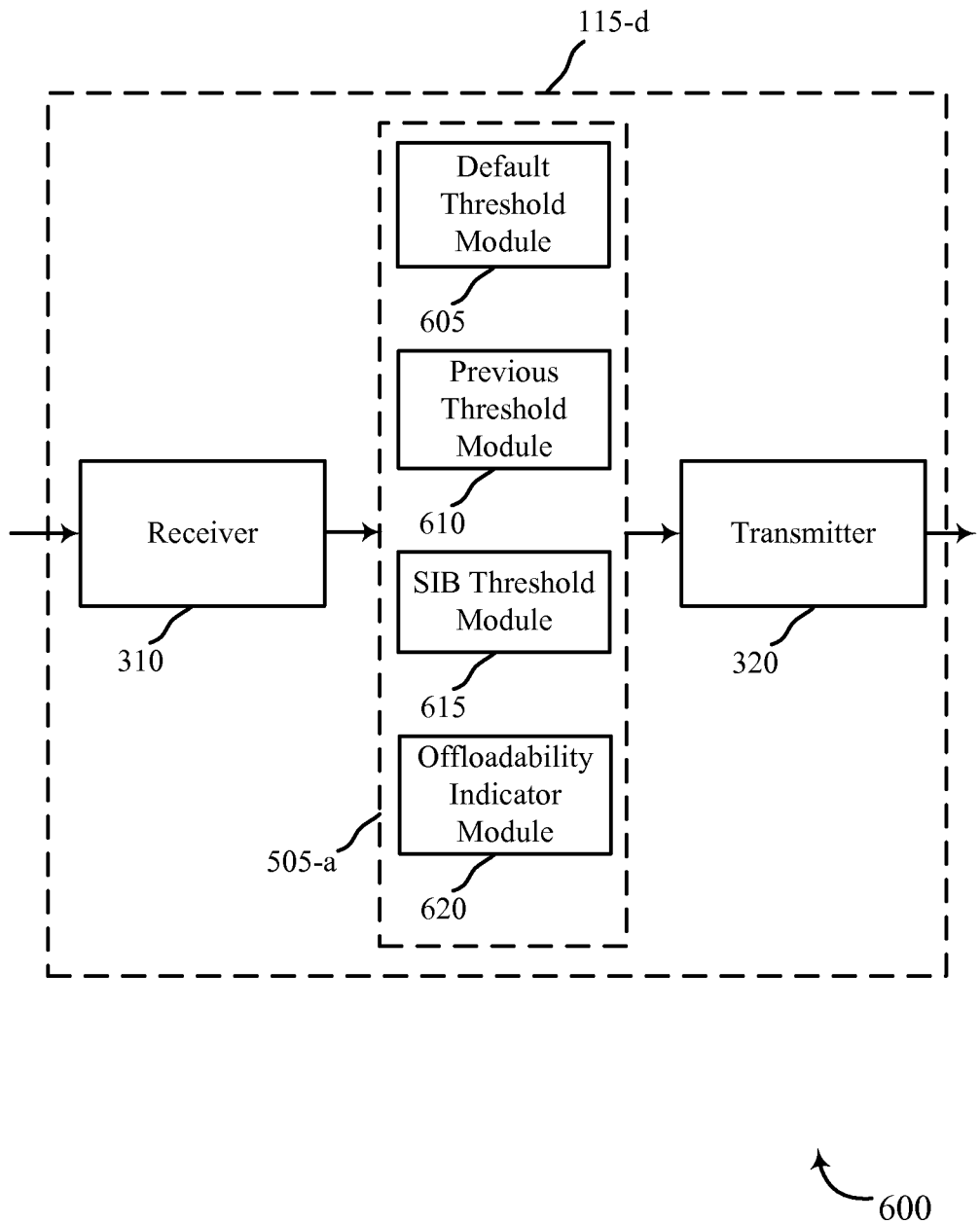
FIG. 6 shows a block diagram of a UE for use in offloading one or more PDN connections in accordance with various embodiments.

FIG. 6 shows a block diagram 600 of a UE 115-d that may offload one or more PDN connections to a WLAN in accordance with various embodiments. The UE 115-d in FIG. 6 may be, for example, one of the UEs 115, 115-a, 115-b, 115-c shown in FIG. 1-2 or 5, and may be an example of one or more aspects of the UE 115-c described with reference to FIG. 5. The UE 115-d shown in FIG. 6 includes a receiver 310, threshold module 505-a, and a transmitter 320. The UE 115-d may also include a processor. Each of these components may be in communication with each other. The threshold module 505-a in FIG. 6 includes a default threshold module 605, a previous threshold module 610, a SIB threshold module 615, and an offloadability indicator module 620.

The components of the UE 115-d may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The receiver 310 may receive information such as packets, user data, and/or control information associated with various information channels (e.g., control channels, data channels, etc.), as described above with reference to FIG. 5. Information may be passed on to the threshold module 505-a, and to other components of the UE 115-d. The threshold module 505-a may be configured to perform the operations described above with reference to the threshold module 505 shown in FIG. 5. The transmitter 320 may transmit the one or more signals received from other components of the UE 115-d, as described above with reference to FIG. 5.

The default threshold module 605, previous threshold module 610, SIB threshold module 615, and offloadability indicator module 620 may all be configured to receive, analyze, and/or provide information for use in determining whether a PDN connection should be offloaded to an available WLAN, should be switched back to a WWAN, or should be maintained on a WWAN or WLAN. The default threshold module 605, previous threshold module 610, and SIB threshold module 615, in particular, may be used to provide alternate thresholds in place of current, UE-specific RAN assistance information if such information is not available to the UE 115-d. The default threshold module 605, for example, may store a default set of thresholds preconfigured in the UE 115-d. This default set of thresholds may be set at sufficiently high (or low) values in order to reduce the likelihood that the UE 115-f will switch a PDN connection back to the WLAN/WWAN from the WWAN/WLAN within a predetermined time period. For example, the default set of thresholds may be stringently set such that a PDN connection is unlikely (e.g., less than 5% chance) of switching back to a WLAN connection within a predetermined time (e.g., 1 second) of switching to a WWAN connection. Doing so may help avoid "ping-ponging" between the WLAN and WWAN for the PDN connection.

The previous threshold module 610 may store a set of thresholds previously received by the UE 115-d; for example, RAN assistance thresholds previously sent by an access point. The set of previously received thresholds may include an expiration time and/or the previous threshold module 610 may only retain and/or use previously received thresholds for a certain period of time before discarding them. The SIB threshold module 615 may receive and process a broadcast set of thresholds (e.g., from SIB broadcast module 410 in FIG. 4) provided by a prospective WWAN, with the broadcast set of thresholds not being specific to the UE 115-d or any UE 115.

The offloadability indicator module 620 may be configured to receive, store, and/or process offloadability indicator (e.g., received from the NAS broadcast module 415 in FIG. 4). For example, the offloadability indicator module 620 may store a received offloadability indicator for later use even if the UE 115-d is not contemporaneously receiving RAN assistance information and/or does not have access to any thresholds for use in making an offloading determination. In this example, the offloadability indicator module 620 may be configured to later utilize the stored offloadability indicator to determine whether to offload a PDN connection to a WLAN when the UE 115-d switched to a RAT that does provide RAN assistance thresholds to the UE 115-d.

In some embodiments, an offloadability indicator received by the offloadability indicator module 620 may be specific to the RAT over which the offloadability indicator was received, and an updated offloadability indicator may be provided by the WWAN when the UE 115-d switches to a different RAT. In other embodiments, an offloadability indicator may be generic to a plurality of different RATs such that the WWAN does not need to send a new offloadability indicator when the UE 115-d switches to a new RAT. In order to enable the reuse of an offloadability indicator among different RATs, the offloadability indicator module 620 may store the generic offloadability indicator, even if the RAT over which the indicator was received does not provide RAN assistance information. Optionally, the offloadability indicator module 620 may also store an expiration associated with any offloadability indicators stored for later use. Again, as described above, the UE 115-d may use the received offloadability indicator(s), together with the received RAN rules and RAN assistance information (e.g., thresholds) in determining whether a PDN connection should be offloaded to a WLAN, or maintained/switched back to a WWAN. In some embodiments, the various thresholds available to the UE 115-d may be used in a hierarchical manner. For example, if live RAN assistance information is available, the UE 115-d may use that information in making PDN connection offloading determinations. If not available, the UE 115-d may use a second-best set of thresholds, such as thresholds that were previously (recently) received by the UE 115-d. If those are not available, the UE 115-d may use generic thresholds broadcast in the SIB broadcast message, and if those are not available, may use the default threshold values preconfigured in the UE 115-d. It will be understood that the hierarchy just described is just one example and that any hierarchy of threshold data may be used.

Figure 7:
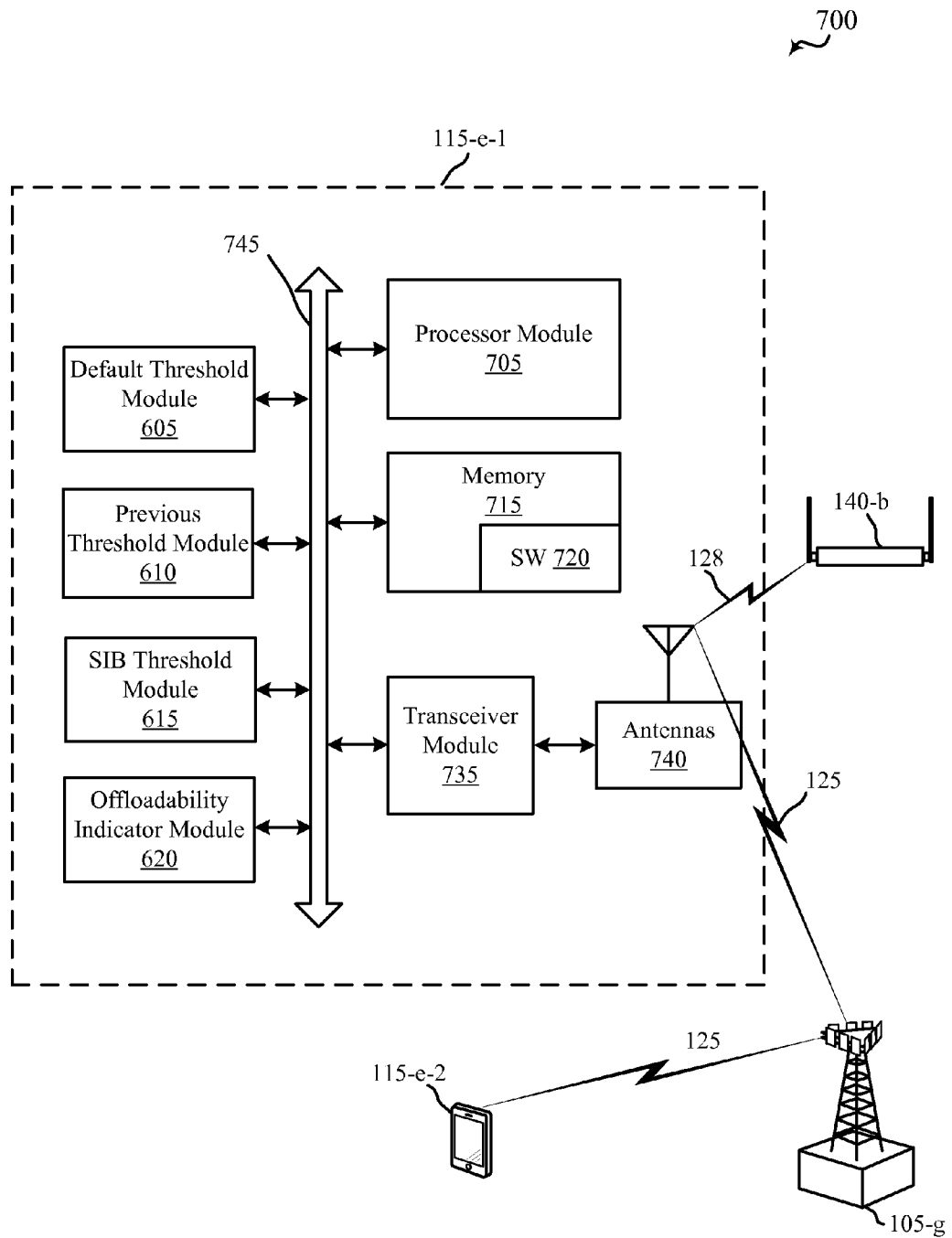
FIG. 7 shows a block diagram of a system for use in offloading one or more PDN connections in accordance with various embodiments.

FIG. 7 shows a block diagram of a system 700 for use in offloading one or more PDN connections in accordance with various embodiments. System 700 includes UEs 115-e-1, 115-e-2, which may be examples of the UEs 115, 115-a, 115-b, 115-c, 115-d in FIGS. 1-2 and 5-6. System 700 also includes a base station 105-g, which may be an example of the base stations 105, 105-a, 105-b, 105-c, 105-d, 105-e, 105-f in FIGS. 1-4. System 700 also includes a WLAN AP 140-b, which may be an example of the WLAN APs 140, 140-a in FIGS. 1-2.

The UE 115-e-1 shown in FIG. 7 includes antenna(s) 740, a transceiver module 735, a processor module 705, and memory 715 (including software (SW) 720), which each may communicate, directly or indirectly, with each other (e.g., via one or more buses 745). The transceiver module 735 may be configured to communicate bi-directionally, via the antenna(s) 740 and/or one or more wireless communication links, with one or more base stations 105-g, one or more WLAN APs 140-b, or other nodes, as described above. The transceiver module 735 may include a modem configured to modulate the packets and provide the modulated packets to the antenna(s) 740 for transmission, and to demodulate packets received from the antenna(s) 740. While the UE 115-e-1 may include a single antenna 740 in some embodiments, the UE 115-e-1 may alternatively have multiple antennas 740 capable of concurrently transmitting and/or receiving multiple wireless transmissions. The transceiver module 735 may thus be capable of concurrently communicating with one or more base stations 105-g and/or one or more WLAN APs 140-b.

The memory 715 may include random access memory (RAM) and/or read-only memory (ROM). The memory 715 may store computer-readable, computer-executable software/firmware code 720 containing instructions that are configured to, when executed, cause the processor module 705 to perform various functions described herein (e.g., make and/or execute offloading determinations). Alternatively, the software/firmware code 720 may not be directly executable by the processor module 705 but be configured to cause a computer (e.g., when compiled and executed) to perform functions described herein. The processor module 705 may include an intelligent hardware device, e.g., a central processing unit (CPU), a microcontroller, an application-specific integrated circuit (ASIC), etc. may include random access memory (RAM) and read-only memory (ROM). The memory 715 may include a data cache, which may store alternative threshold information, as described above with reference to FIG. 6.

The UE 115-e-1 also includes default threshold module 605, previous threshold module 610, SIB threshold module 615, and offloadability indicator module 620, which may be examples of the respective default threshold module 605, previous threshold module 610, SIB threshold module 615, and offloadability indicator module 620 shown in FIG. 6 and described above, and may together form a threshold module, which may be an example of the threshold module 505 shown and described above with reference to FIG. 5.

Figure 8:
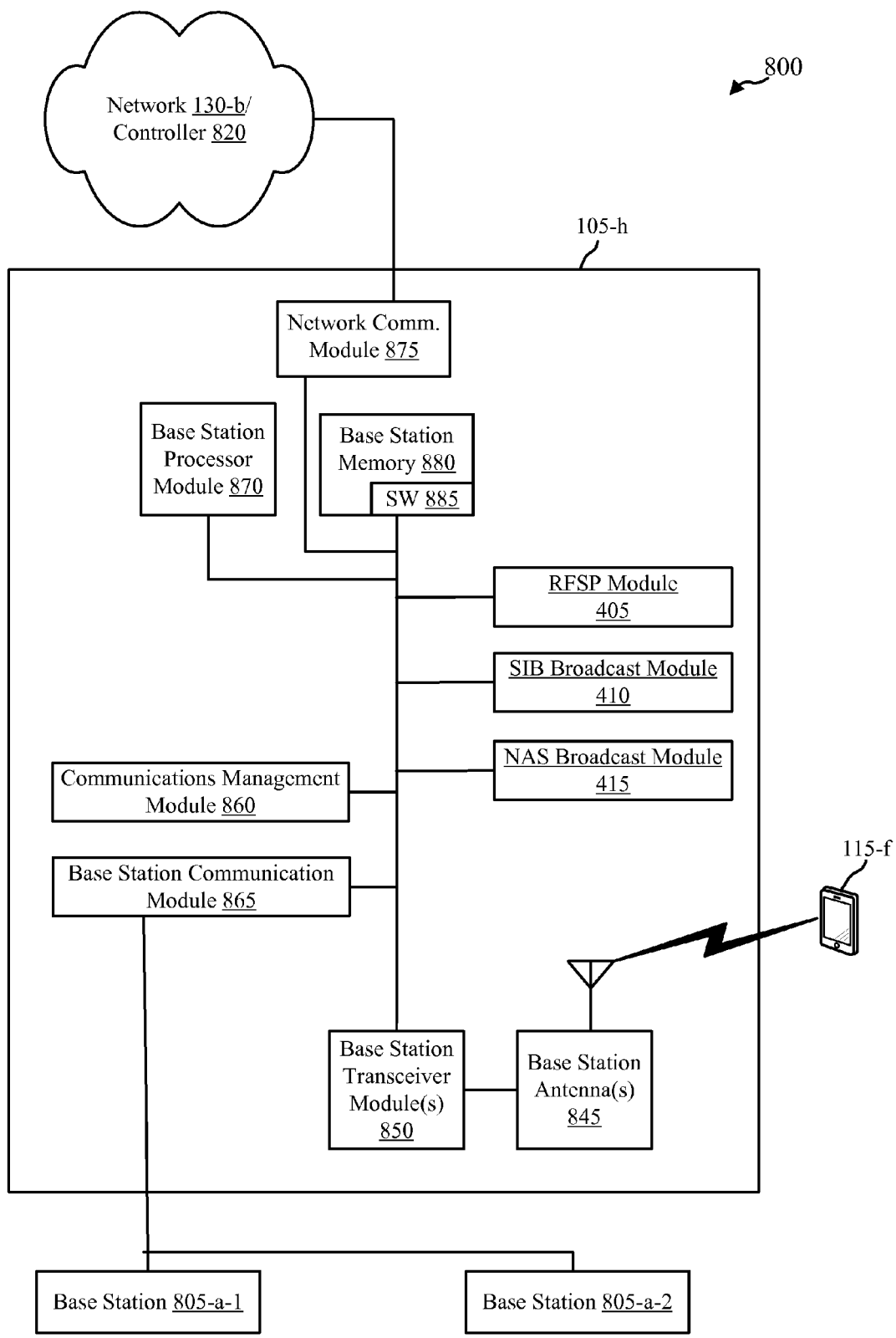
FIG. 8 shows a block diagram of a system for use in offloading one or more PDN connections in accordance with various embodiments.

FIG. 8 shows a diagram of a system 800 for use in offloading one or more PDN connections in accordance with various embodiments. System 800 includes base stations 105-h, 805-a-1, 805-a-2, which may be examples of the base stations 105, 105-a, 105-b, 105-c, 105-d, 105-e, 105-f, 105-g described above. System 800 also includes a UE 115-f, which may be an example of the UEs 115, 115-a, 115-b, 115-c, 115-d, 115-e described above.

The base station 105-h may include antenna(s) 845, a transceiver module 850, memory 880, and a processor module 870, which each may be in communication, directly or indirectly, with each other (e.g., over one or more buses). The transceiver module 850 may be configured to communicate bi-directionally, via the antenna(s) 845, with the UE 115-f as well as other UEs (not shown in FIG. 8). The transceiver module 850 (and/or other components of the base station 105-d) may also be configured to communicate bi-directionally with one or more networks. In some cases, the base station 105-h may communicate with the core network 130-a and/or controller 820—through network communications module 875. Base station 105-h may be an example of an eNodeB base station, a Home eNodeB base station, a NodeB base station, and/or a Home NodeB base station. Controller 820 may be integrated into base station 105-h in some cases, such as with an eNodeB base station.

Base station 105-h may also communicate with other base stations 105, such as base station 805-a-1 and base station 805-a-2. Each of the base stations 105, 805-a-1, 805-a-2 may communicate with one or more UEs using different wireless communications technologies, such as different Radio Access Technologies. In some cases, base station 105-h may communicate with other base stations such as 805-a-1 and/or 805-a-2 utilizing base station communication module 865. In some embodiments, base station communication module 865 may provide an X2 interface within an LTE wireless communication technology to provide communication between some of the base stations 105-h, 805-a-1, 805-a-2. In some embodiments, base station 105-h may communicate with other base stations through controller 820 and/or core network 130-b.

The memory 880 may include random access memory (RAM) and read-only memory (ROM). The memory 880 may also store computer-readable, computer-executable software code 885 containing instructions that are configured to, when executed, cause the processor module 870 to perform various functions described herein (e.g., call processing, database management, message routing, etc.).

Alternatively, the software code 885 may not be directly executable by the processor module 870 but may be configured to cause the computer, e.g., when compiled and executed, to perform functions described herein.

The processor module 870 may include an intelligent hardware device, e.g., a central processing unit (CPU), a microcontroller, an application-specific integrated circuit (ASIC), etc. The transceiver module 850 may include a modem configured to modulate the packets and provide the modulated packets to the antenna(s) 845 for transmission, and to demodulate packets received from the antenna(s) 845. While some examples of the base station 105-*h* may include a single antenna 845, the base station 105-*h* preferably includes multiple antennas 845 for multiple links which may support carrier aggregation. For example, one or more links may be used to support macro communications with UEs 115.

According to the architecture of FIG. 8, the base station 105-*h* may further include a communications management module 860. The communications management module 860 may manage communications with other base stations 105. By way of example, the communications management module 860 may be a component of the base station 105-*h* in communication with some or all of the other components of the base station 105-*h* via a bus. Alternatively, functionality of the communications management module 860 may be implemented as a component of the transceiver module 850, as a computer program product, and/or as one or more controller elements of the processor module 870.

The base station 105-*h* in FIG. 8 also includes RFSP Module 405, SIB broadcast module 410, and NAS broadcast module 415, which may be examples of the respective RFSP Module 405, SIB broadcast module 410, and NAS broadcast module 415 shown in FIG. 4 and described above, and may together form an offloading module, which may be an example of the offloading module 315 shown and described above with reference to FIG. 3.

Figure 9:
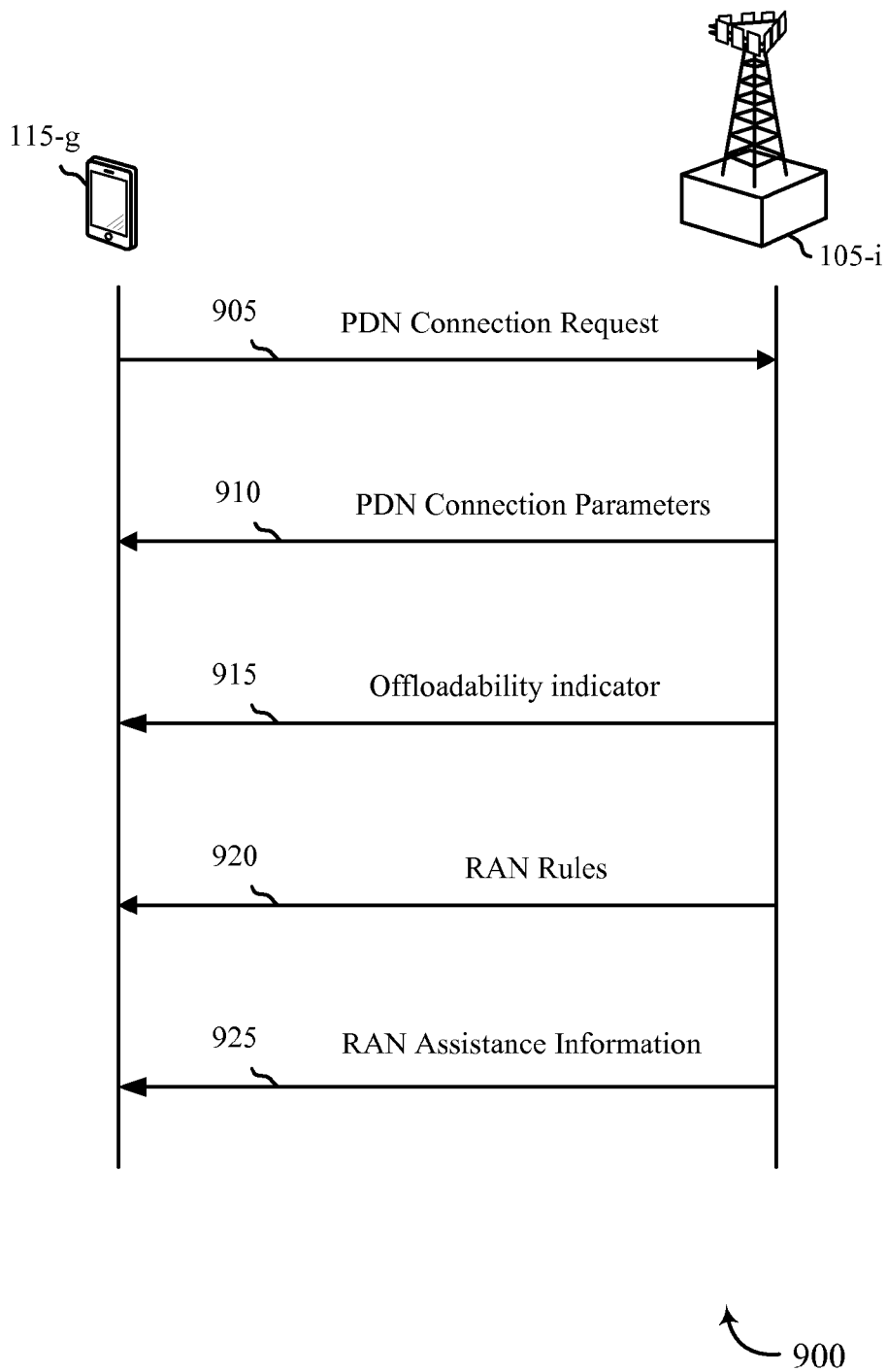
FIG. 9 shows an example of a signaling flow for use in offloading one or more PDN connections in accordance with various embodiments.

FIG. 9 illustrates a diagram 900 of a signaling flow between a UE 115-*g* and a base station 105-*i* for use in offloading one or more PDN connections in accordance with various embodiments. The UE 115-*g* may be an example of the UEs 115, 115-*a*, 115-*b*, 115-*c*, 115-*d*, 115-*e*, 115-*f* described above, and the base station 105-*i* may be an example of the base stations 105, 105-*a*, 105-*b*, 105-*c*, 105-*d*, 105-*e*, 105-*f*, 105-*g*, 105-*h* described above. The UE 115-*g* may transmit a PDN connection request 905 to the base station 105-*i* indicating that the UE 115-*g* desires to initiate a PDN connection. In response, the base station 105-*i* sends PDN connection parameters 910 to the UE 115-*g*, which may enable the UE 115-*g* and base station 105-*i* to initiate the PDN connection.

The base station may also send, via NAS signaling, an offloadability indicator 915 to the UE 115-*g* as described above—for example, an offloadability status indicator may be provided in a bearer context status IE in the accept message to the PDN connection activation request. In some instances, the offloadability indicator associated with that PDN connection may be sent to the UE 115-*g* upon initiation of the PDN connection, whereas in other embodiments the offloadability indicator may be sent later. In some embodiments, an updated offloadability indicator may later be sent to the UE 115-*g* in response to some change, such as if the UE 115-*g* switches to a different RAT connection with the base station 105-*i*, if there are too many connections or too much traffic demand on a particular WWAN or WLAN, etc.

The updated offloadability indicator may be provided in an updated bearer context status in a NAS message to the UE 115-*g* in some embodiments. In some examples, the messages 905, 910, and 915 may be sent and/or received between a Serving GPRS Support Node (SGSN) and a Mobility Management Entity (MME).

In some embodiments, the base station 105-*i* always sends the offloadability indicator—that is, the base station 105-*i* sends the offloadability indicator irrespective of a mode of communication between the UE 115-*g* and base station 105-*i*. In these embodiments, even if the UE 115-*g* is in an A/Gb mode of operation, the offloadability indicator may still be sent, and the UE 115-*g* may simply store the indicator for later use (i.e., in case the UE 115-*g* later connects to base station 105-*i* in an Iu or LTE mode of operation). In other embodiments, however, the base station 105-*i* may first determine a mode of operation associated with each UE 115-*g*, and may only send the offloadability indicators associated with respective PDN connections if the UE is in a certain mode of operation—such as a mode of operation in which WLAN offloading is permitted.

The base station 105-*i* may also send RAN rules 920 and RAN assistance information 925 to the UE 115-*g* using RAN signaling in some embodiments. As described above, even if the UE 115-*g* cannot offload any PDN connections, the UE 115-*g* may store the RAN rules and/or RAN assistance information received from the base station 105-*i* for later use.

Figure 13A:
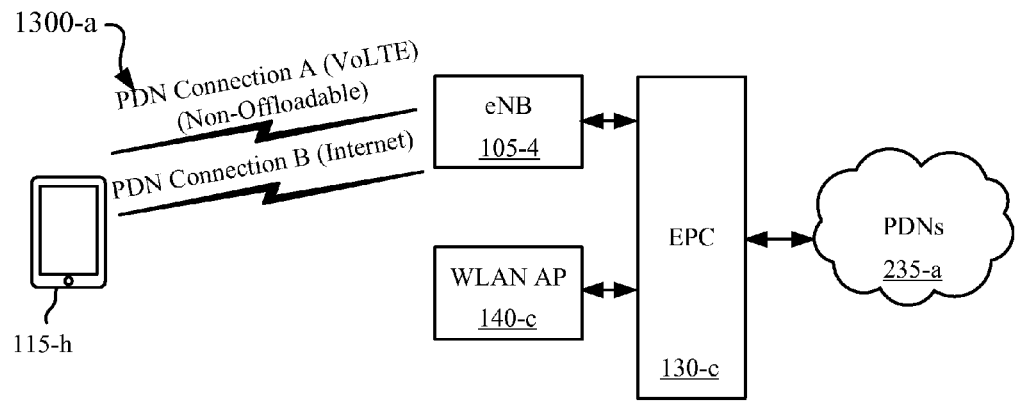
FIGS. 13A and 13B provide examples of how one or more PDN connections can be offloaded to a WLAN in accordance with various embodiments.
Figure 13B:
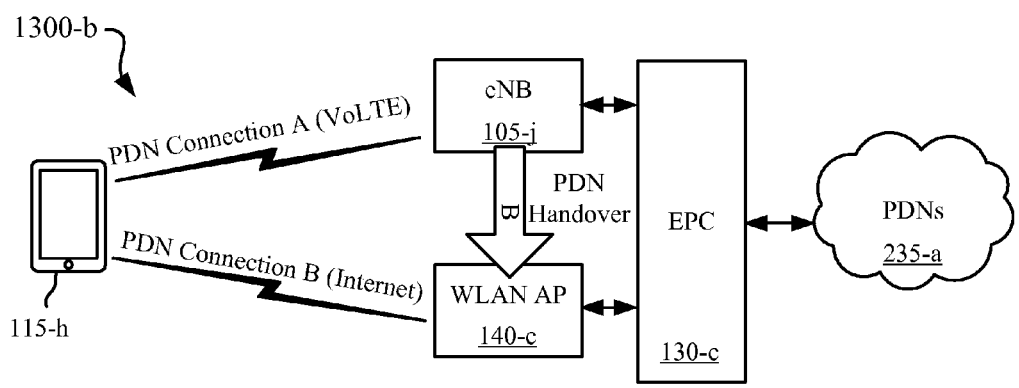
Figure 14A:
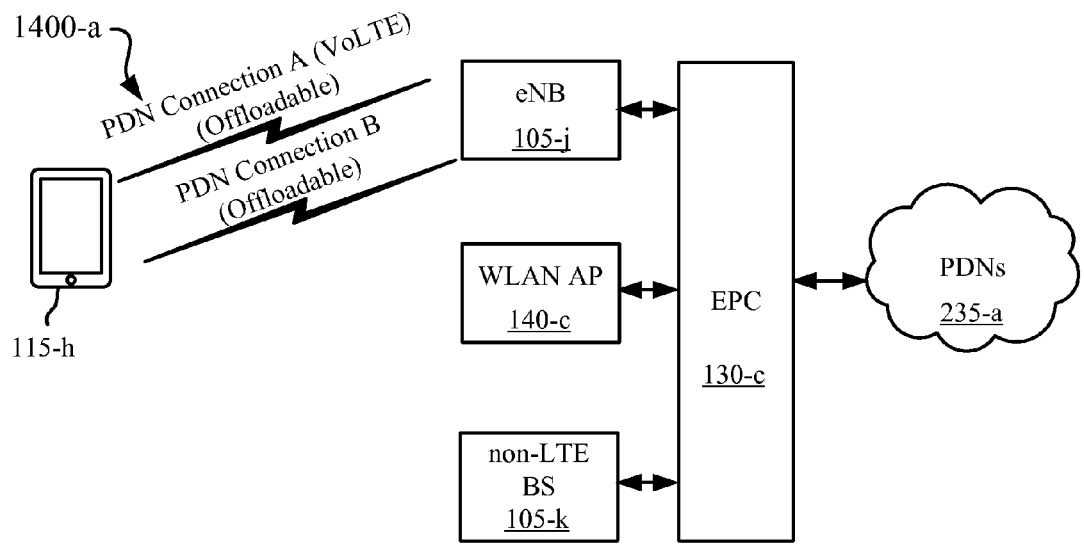
FIGS. 14A and 14B provide examples of how one or more PDN connections can be offloaded to a WLAN in accordance with various embodiments.
Figure 14B:
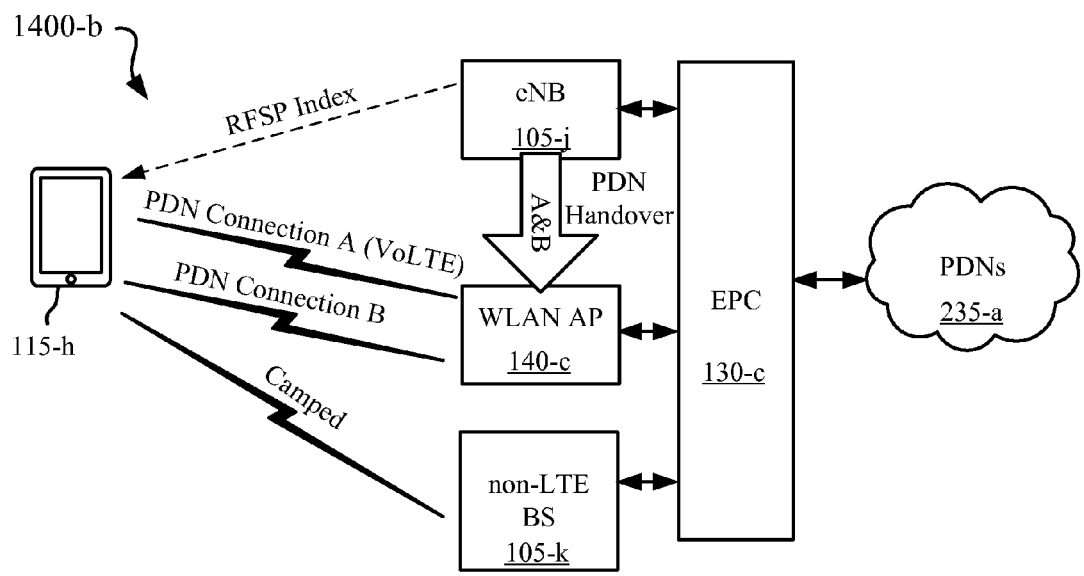
Figure 15A:
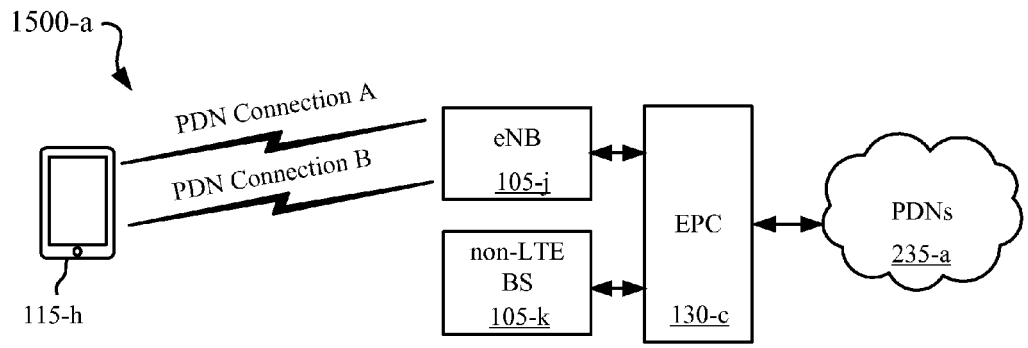
FIGS. 15A and 15B provide examples of how one or more PDN connections can be moved to a different WWAN in accordance with various embodiments.
Figure 15B:
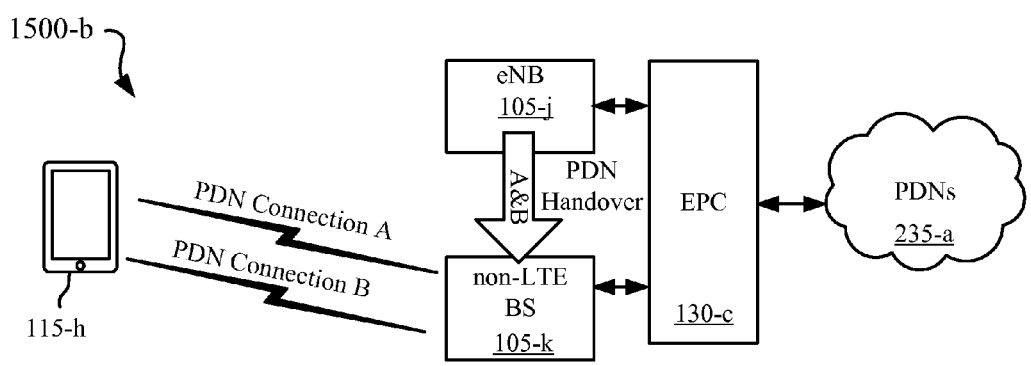

FIGS. 10A, 10B, 11A, 11B, 12A, 12B, 13A, 13B, 14A, 14B provide examples of how one or more PDN connections of a UE 115-*h* may be offloaded from an eNB base station 105-*j* to a WLAN AP 140-*c*, and FIGS. 15A and 15B provide examples of how one or more PDN connections can be moved from an eNB/LTE base station 105-*j* to a non-LTE base station 105-*k*, and the repercussions of such a move.

Figure 10A:
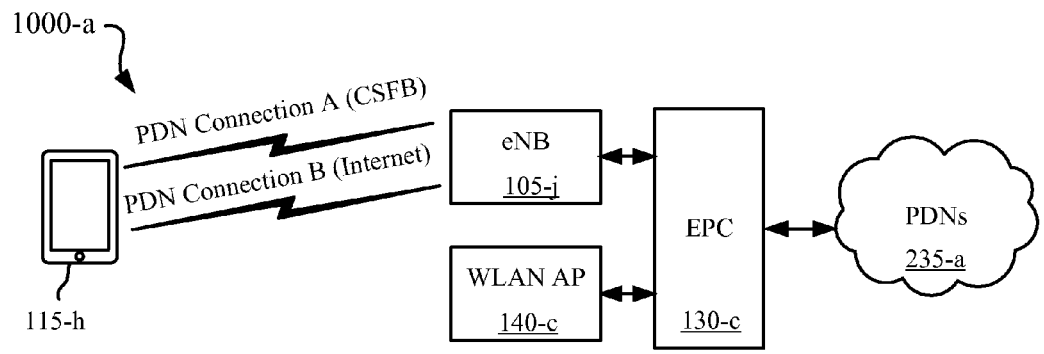
FIGS. 10A and 10B provide examples of how one or more PDN connections can be offloaded to a WLAN in accordance with various embodiments.

Referring first to FIG. 10A, a diagram illustrates a configuration of a wireless communication system 1000-*a* in which a UE 115-*h* may have a CSFB PDN Connection A and an Internet PDN Connection B with a eNB base station 105-*j*. The PDN Connections A and B may connect to different APNs over the WWAN associated with the eNB base station 105-*j*. Each of the eNB base station 105-*j* and the WLAN AP 140-*c* may have a connection to an EPC 130-*c*, which may in turn have a connection to PDNs 235-*a*. The wireless communication system 1000-*a*, UE 115-*h*, eNB base station 105-*j*, WLAN AP 140-*c*, EPC 130-*a*, and PDNs 235-*a* may be examples of one or more aspects of respective communications systems, UEs, base stations, WLAN Aps, EPCs, and PDNs described above.

At some point during operation of the wireless communications system 1000-*a*, a triggering event may cause one of the PDN connections to be offloaded from the eNB 105-*j* to the WLAN AP 140-*c*. For example, the triggering event may include a decision by an access management module of the UE 115-*h* that a WLAN is preferred over the LTE WWAN. In other cases, the triggering event may include activity (e.g., a request) of an application running on the UE 115-*h* or the user of the UE 115-*h*. In FIG. 10A, the triggering event is a request to move traffic via NSWO to the WLAN AP.

Figure 10B:
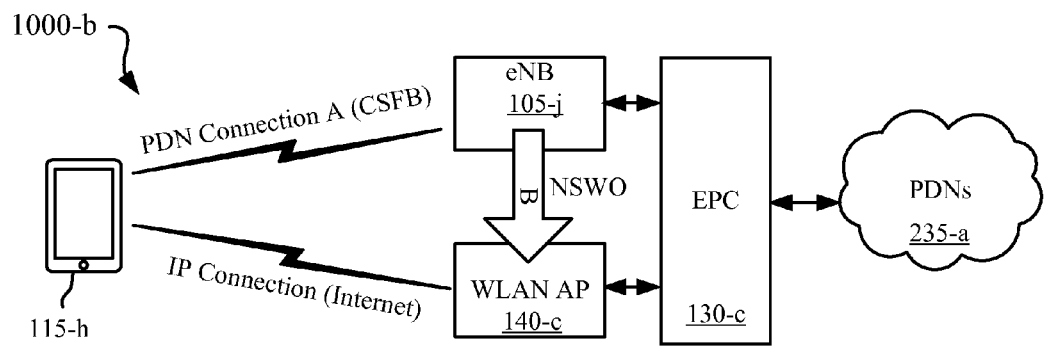

FIG. 10B is a diagram illustrating a configuration of a wireless communications system 1000-*b* that may result from the NSWO triggering event described above. In the configuration, the UE 115-*h* maintains the PDN Connection A for the CSFB with the eNB 105-*j*, but the traffic for the Internet application on the UE 115-*h* is moved, via NSWO to the WLAN AP 140-*c*. In this example, the UE 115-*h* may not detach from the LTE WWAN, because of the remaining PDN Connection A for CSFB. As such, there may be no interruption of voice services and there similarly may be no issue with the UE 115-*h* continuing to receive RAN assistance information from the LTE WWAN.

Figure 11A:
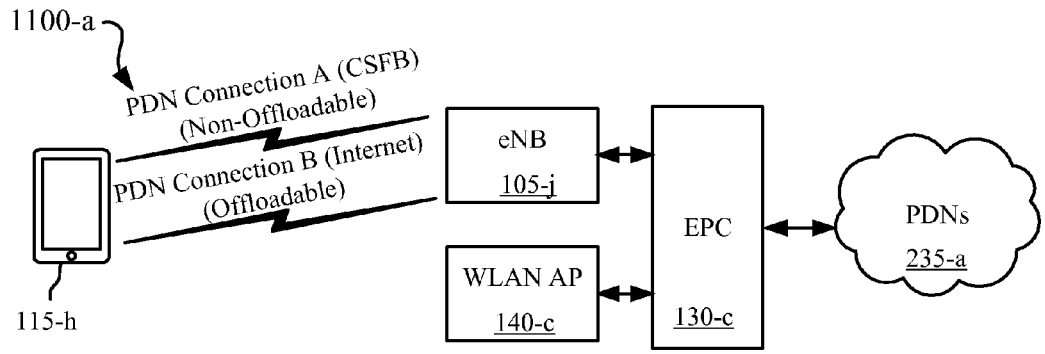
FIGS. 11A and 11B provide examples of how one or more PDN connections can be offloaded to a WLAN in accordance with various embodiments.
Figure 11B:
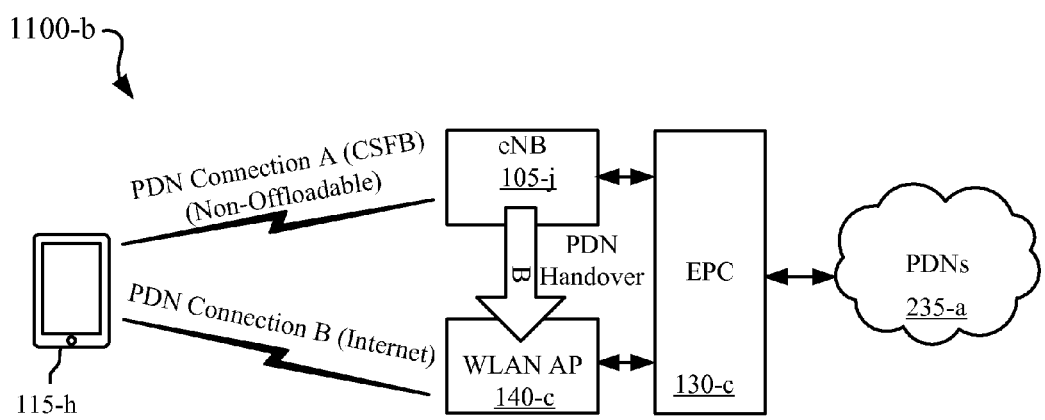

FIGS. 11A and 11B are diagrams illustrating configurations of wireless communications systems 1100-*a*, 1100-*b* that are similar to the systems 1000-*a*, 1000-*b* shown in FIGS. 10A and 10B, except that PDN Connection A (CSFB) has been designated as non-offloadable and PDN Connection B (Internet) has been designated as offloadable. Also, the triggering event in FIGS. 11A and 11B may cause the PDN Connection B to be offloaded to the WLAN AP 140-*c* via a PDN handover (instead of via NSWO). However, because there is still an active PDN connection (Connection A) from the UE 115-*h* to the LTE WWAN, there may be no voice services interruption and no issue with the UE 115-*h* continuing to receive RAN assistance information from the LTE WWAN.

Figure 12A:
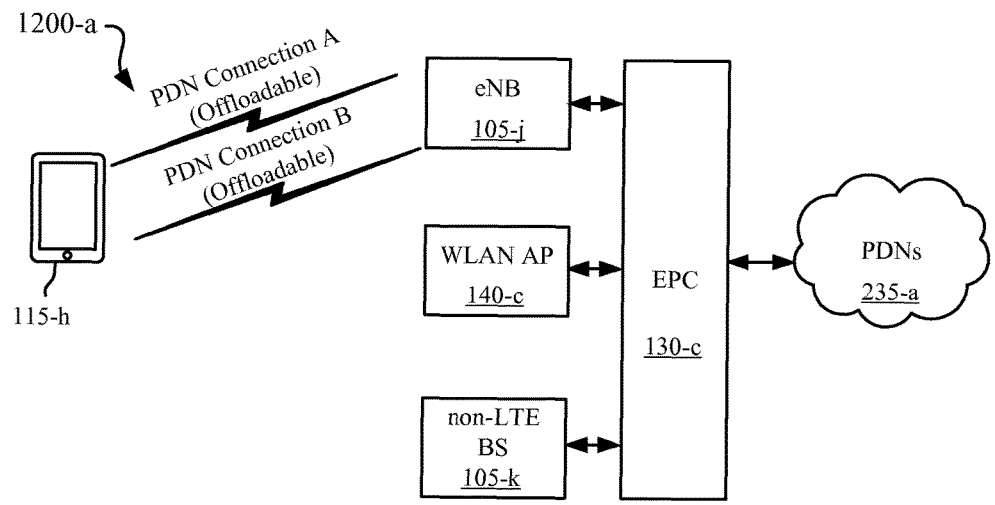
FIGS. 12A and 12B provide examples of how one or more PDN connections can be offloaded to a WLAN in accordance with various embodiments.
Figure 12B:
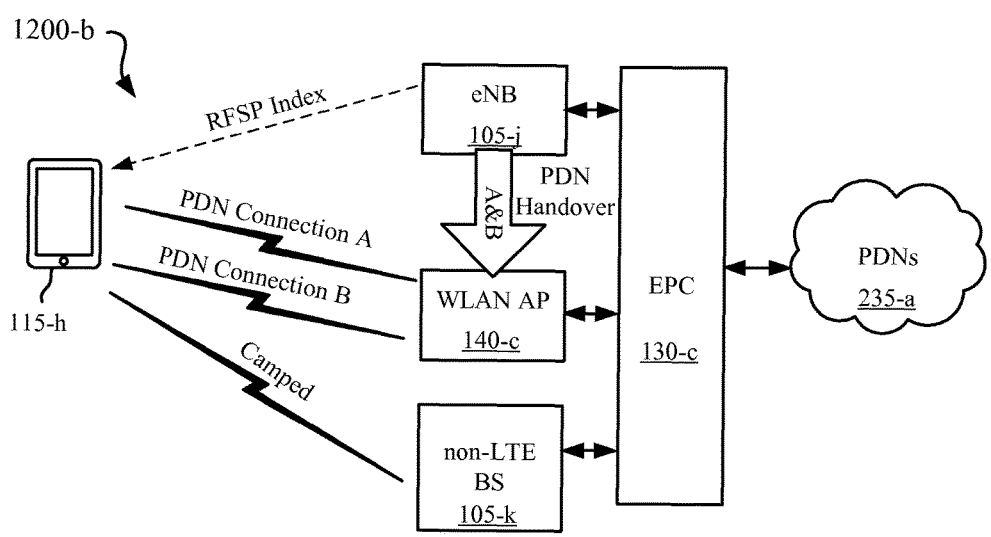

FIGS. 12A and 12B are diagrams illustrating configurations of wireless communications systems 1200-*a*, 1200-*b* that are similar to the systems 1100-*a*, 1100-*b* shown in FIGS. 11A and 11B, except that in FIGS. 12A and 12B, both PDN Connection A and PDN Connection B have been designated as offloadable. After a triggering event causing PDN Connections A and B to be offloaded to the WLAN AP 140-*c* via a PDN handover, the UE 115-*h* may detach from the LTE WWAN of the eNB 105-*j*. In this instance, if the UE 115-*h* does not quickly reattach to a WWAN, there may be an interruption of one or both of CS based services and/or receiving RAN assistance information for facilitating the eventual switch back to the WWAN of the PDN traffic offloaded to the WLAN AP 140-*c*. As such, and as described above, the UE 115-*h* may receive RFSP index information from, for example, the eNB base station 105-*j* which may cause the UE 115-*h* to camp on a non-LTE base station 105-*k*, which may include a UTRAN or GERAN RAT. It will be appreciated that while the non-LTE base station 105-*k* is illustrated in FIGS. 12A and 12B as being physically separate from the LTE eNB 105-*j*, in some embodiments, the eNB 105-*j* and non-LTE BS 105-*k* may be one and the same base station, but may use different RATs in their respective WWAN services.

FIGS. 13A and 13B are diagrams illustrating configurations of wireless communications systems 1300-*a*, 1300-*b* that are similar to the systems 1100-*a*, 1100-*b* shown in FIGS. 11A and 11B, except that in FIGS. 13A and 13B, VoLTE is used for voice services (i.e., instead of CSFB), and the PDN Connection A for VoLTE has been designated as non-offloadable. in this example, because there is still an active PDN connection (Connection A) from the UE 115-*h* to the LTE WWAN, there may be no voice services interruption and no issue with the UE 115-*h* continuing to receive RAN assistance information from the LTE WWAN even if the PDN Connection B is offloaded to the WLAN AP.

FIGS. 14A and 14B are diagrams illustrating configurations of wireless communications systems 1400-*a*, 1400-*b* that are similar to the systems 1200-*a*, 1200-*b* shown in FIGS. 12A and 12B and the systems 1300-*a*, 1300-*b* shown in FIGS. 13A and 13B, except that in FIGS. 14A and 14B, VoLTE is used for voice services and both PDN Connection A (VoLTE) and PDN Connection B (Internet) have been designated as offloadable. Accordingly, after a triggering event causing PDN Connections A and B to be offloaded to the WLAN AP 140-*c* via a PDN handover, the UE 115-*h* may detach from the LTE WWAN of the eNB 105-*j*. In this instance, if the UE 115-*h* does not quickly reattach to a WWAN, there may be an interruption of receiving RAN assistance information for facilitating the eventual switch back to the WWAN of the PDN traffic offloaded to the WLAN AP 140-*c*, for example. As such, and as described above, the UE 115-*h* may receive RFSP index information from, for example, the eNB base station 105-*j* which may cause the UE 115-*h* to camp on a non-LTE base station 105-*k*, which may include a UTRAN or GERAN RAT.

FIGS. 15A and 15B are diagrams illustrating configurations of wireless communications systems 1500-*a*, 1500-*b* that are similar to the systems 1000-*a*, 1000-*b* shown in FIGS. 10A and 10B, except that in FIGS. 15A and 15B, PDN Connections A and B are offloaded to a non-LTE WWAN 105-*k* instead of to a WLAN AP. In this scenario, an offloadability indicator received when the UE 115-*h* was connected to the LTE WWAN 105-*j* may have been stored and may still be used together with RAN assistance information received from the non-LTE BS 105-*k* to make offloading determinations, as described above.

Figure 16:
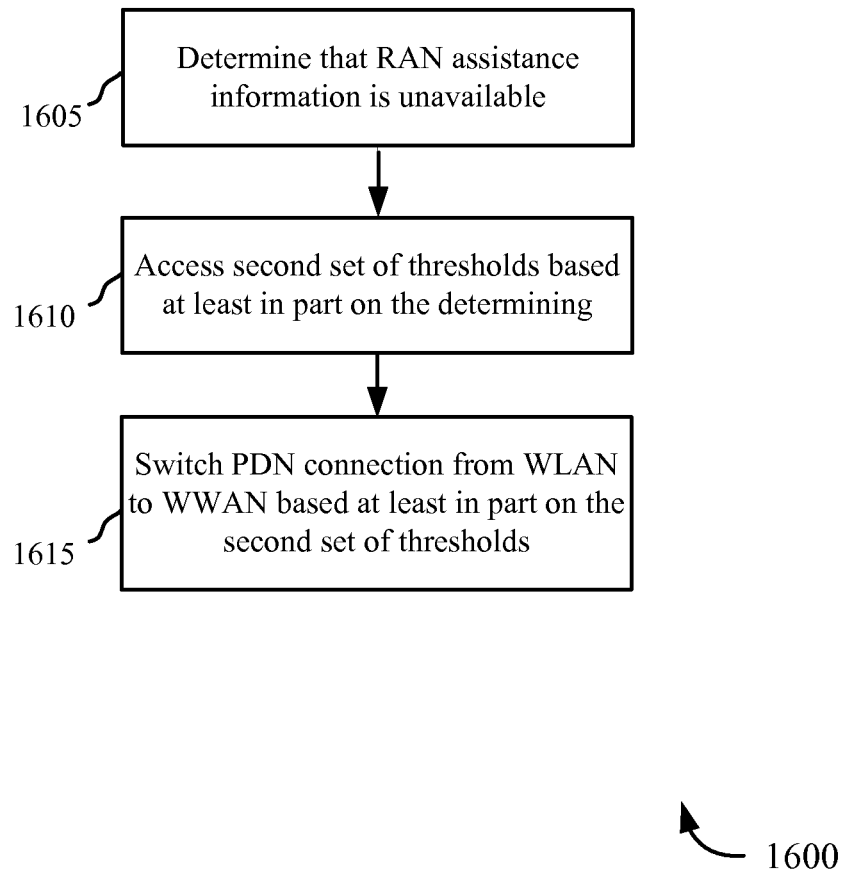
FIG. 16 shows a flowchart of a method for use in offloading one or more PDN connections in accordance with various embodiments.

FIG. 16 shows a flowchart 1600 illustrating a method of switching a PDN connection from a WLAN to a WWAN in accordance with various embodiments. The functions of flowchart 1600 may be implemented by any of the UEs 115 described above.

At block 1605, the UE may determine that RAN assistance information is unavailable, where the RAN assistance information includes a first set of thresholds for switching a specific PDN connection of the UE from a WLAN back to a WWAN. At block 1610, the UE may access a second, alternative set of thresholds based at least in part on the determining of block 1605 (as described above), and at block 1615, the UE may switch the PDN connection from the WLAN back to the WWAN based at least in part on the second set of thresholds accessed at block 1610.

It should be noted that the method of flowchart 1600 is just one implementation of the operations of the method, and that the steps may be rearranged or otherwise modified such that other implementations are possible.

Figure 17:
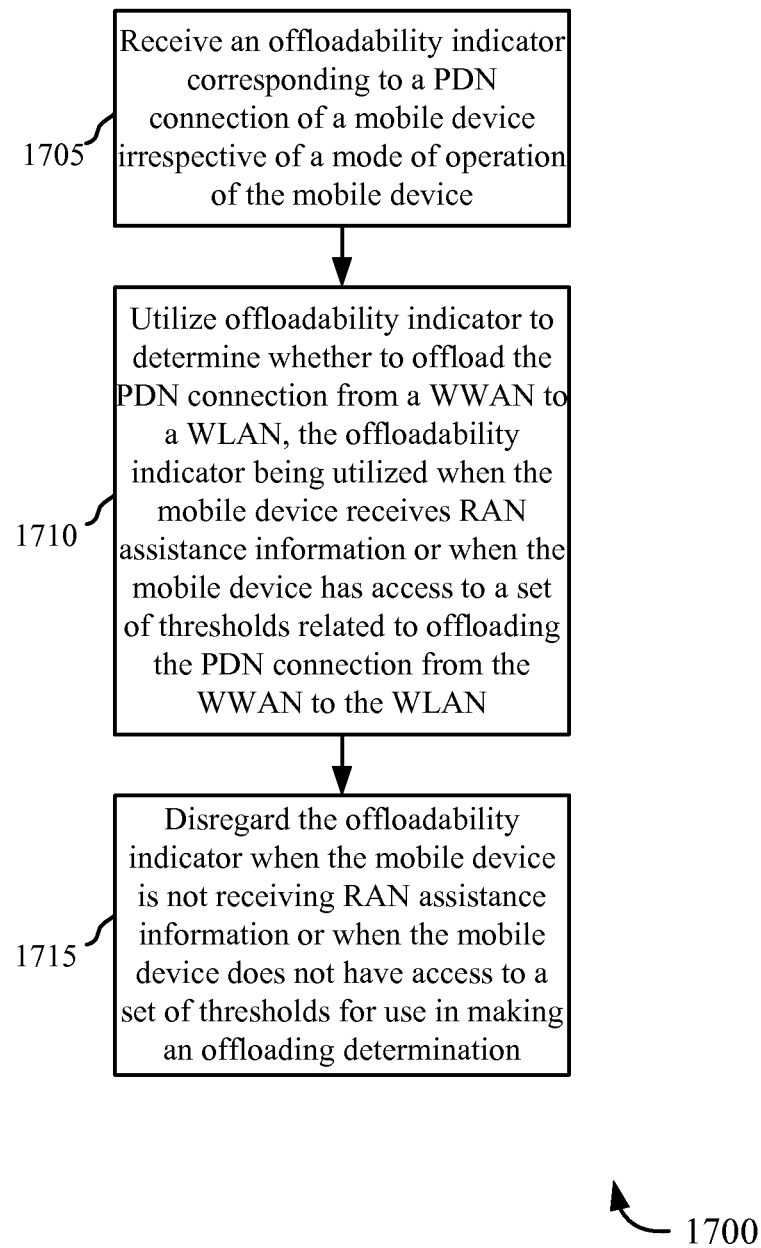
FIG. 17 shows a flowchart of a method for use in offloading one or more PDN connections in accordance with various embodiments.

FIG. 17 shows a flowchart 1700 illustrating a method of utilizing an offloadability indicator to determine whether to offload a PDN connection from a WWAN to a WLAN in accordance with various embodiments. The functions of flowchart 1700 may be implemented by any of the UEs 115 described above.

At block 1705, the UE may receive an offloadability indicator corresponding to a PDN connection of the UE, the offloadability indicator being received by the UE irrespective of a mode of operation of the UE. At block 1710, the UE may utilize the offloadability indicator received at block 1705 to determine whether to offload the PDN connection from the WWAN to the WLAN, the offloadability indicator being utilized when the UE receives RAN assistance information or has access to a set of thresholds related to offloading the PDN connection from the WWAN to the WLAN. At block 1715, the UE may disregard the offloadability indicator received at block 1705 when the UE is not receiving RAN assistance information or does not have access to a set of thresholds for use in making an offloading determination.

It should be noted that the method of flowchart 1700 is just one implementation of the operations of the method, and that the steps may be rearranged or otherwise modified such that other implementations are possible.

Figure 18:
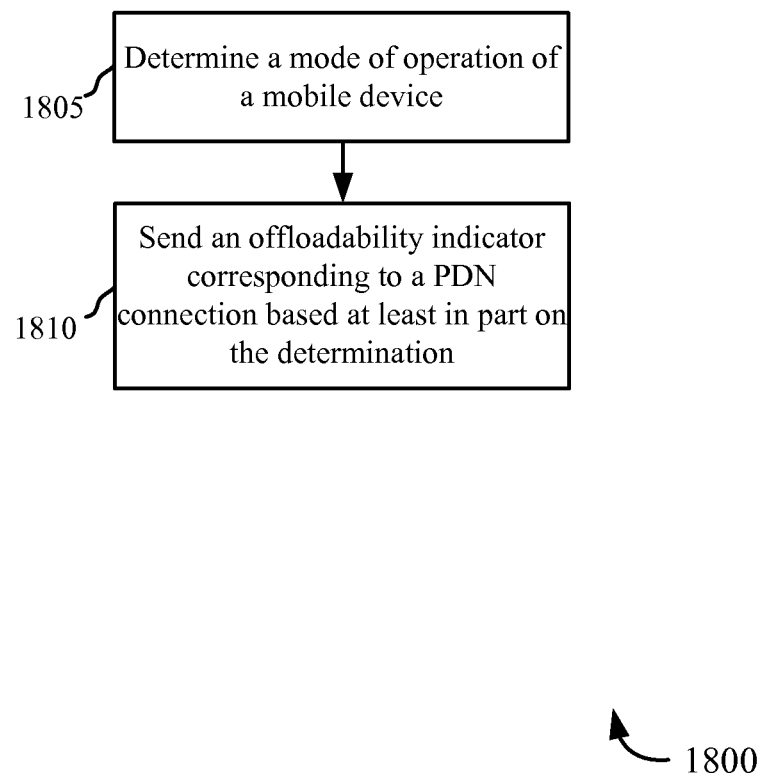
FIG. 18 shows a flowchart of a method for use in offloading one or more PDN connections in accordance with various embodiments.

FIG. 18 shows a flowchart 1800 illustrating a method of sending offloadability indicators in accordance with various embodiments. The functions of flowchart 1600 may be implemented by any of the base stations 105 described above.

At block 1805, the base station may determine a mode of operation of a UE, and at block 1810, the base station may send an offloadability indicator corresponding to a PDN connection based at least in part on the determination.

It should be noted that the method of flowchart 1800 is just one implementation of the operations of the method, and that the steps may be rearranged or otherwise modified such that other implementations are possible.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method for wireless communication, comprising:
establishing, by a mobile device, a packet data network (PDN) connection via a first wireless wide area network (WWAN);
offloading the PDN connection from the first WWAN to a wireless local area network (WLAN);
determining to camp on a second WWAN based at least in part on all PDN connections of the mobile device being offloaded to the WLAN and a cellular radio of the mobile device being in idle mode;
determining, by the mobile device, that Radio Access Network (RAN) assistance information is unavailable, the RAN assistance information comprising a first set of thresholds for switching the PDN connection of the mobile device from the WLAN to the first WWAN;
accessing a second set of thresholds for switching one or more PDN connections of the mobile device to the first WWAN based at least in part on the determination that RAN assistance information is unavailable, wherein the second set of thresholds comprise a default set of thresholds preconfigured in the mobile device; and
switching the one or more PDN connections of the mobile device from the WLAN to the first WWAN based at least in part on the second set of thresholds.

2. The method of claim 1, wherein the second set of thresholds comprises one or more of a connection quality indication (CQI) associated with the WLAN or the first WWAN, an Internet accessibility indication associated with the WLAN and/or the first WWAN, a signal strength indication associated with the WLAN and/or the first WWAN, and/or a power level associated with the mobile device.

3. The method of claim 1, wherein the default set of thresholds is set to values sufficiently high in order to reduce a likelihood that the mobile device will switch the one or more PDN connections back to the WLAN within a predetermined time period after switching to the first WWAN.

4. The method of claim 1, wherein the second set of thresholds comprises a broadcast set of thresholds provided by the first WWAN, the broadcast set of thresholds being unspecific to the mobile device.

5. The method of claim 4, further comprising:
receiving the broadcast set of thresholds via a system information block (SIB) from the first WWAN.

6. The method of claim 1, wherein determining to camp on the second WWAN comprises receiving an indication which prioritizes the mobile device camping on the second WWAN over camping on the first WWAN.

7. The method of claim 1, wherein the second WWAN is one of Global Systems for Mobile communications (GSM) Enhanced Data Rates for GSM Evolution (EDGE) radio access network (GERAN) or Universal Mobile Telecommunications System (UMTS) Terrestrial Radio Access Network (UTRAN) in order to reduce a probability of missing a circuit switched (CS) call at the mobile device.

8. The method of claim 1, wherein the second WWAN is Universal Mobile Telecommunications System (UMTS) Terrestrial Radio Access Network (UTRAN) in order to allow the mobile device to continue receiving RAN assistance information related to the first WWAN.

9. An apparatus for wireless communication, comprising:
a processor;
memory in electronic communication with the processor, the memory embodying instructions, the instructions being executable by the processor to:
establish, by a mobile device, a packet data network (PDN) connection via a first wireless wide area network (WWAN);
offload the PDN connection from the first WWAN to a wireless local area network (WLAN);
determine to camp on a second WWAN based at least in part on all PDN connections of the mobile device being offloaded to the WLAN and a cellular radio of the mobile device being in idle mode;
determine, by the mobile device, that Radio Access Network (RAN) assistance information is unavailable, the RAN assistance information comprising a first set of thresholds for switching the PDN connection of the mobile device from the WLAN to the first WWAN;
access a second set of thresholds for switching one or more PDN connections of the mobile device to the first WWAN based at least in part on the determination that RAN assistance information is unavailable, wherein the second set of thresholds comprise a default set of thresholds preconfigured in the mobile device; and
switch the one or more PDN connections of the mobile device from the WLAN to the first WWAN based at least in part on the second set of thresholds.

10. The apparatus of claim 9, wherein the second set of thresholds comprises one or more of a connection quality indication (CQI) associated with the WLAN or the first WWAN, an Internet accessibility indication associated with the WLAN and/or the first WWAN, a signal strength indication associated with the WLAN and/or the first WWAN, and/or a power level associated with the apparatus.

11. The apparatus of claim 9, wherein the default set of thresholds is set to values sufficiently high in order to reduce a likelihood that the apparatus will switch the one or more PDN connections back to the WLAN within a predetermined time period after switching to the first WWAN.

12. The apparatus of claim 9, wherein the second set of thresholds comprises a broadcast set of thresholds provided by the first WWAN, the broadcast set of thresholds being unspecific to the apparatus.

13. The apparatus of claim 12, wherein the instructions are further executable by the processor to:
receive the broadcast set of thresholds via a system information block (SIB) from the first WWAN.

14. A non-transitory computer-readable medium storing instructions executable by a processor to cause a wireless communication apparatus to:
establish, by a mobile device, a packet data network (PDN) connection via a first wireless wide area network (WWAN);
offload the PDN connection from the first WWAN to a wireless local area network (WLAN);
determine to camp on a second WWAN based at least in part on all PDN connections of the mobile device being offloaded to the WLAN and a cellular radio of the mobile device being in idle mode;
determine, by the mobile device, that Radio Access Network (RAN) assistance information is unavailable, the RAN assistance information comprising a first set of thresholds for switching the PDN connection of the mobile device from the WLAN to the first WWAN;
access a second set of thresholds for switching one or more PDN connections of the mobile device to the first WWAN based at least in part on the determination that RAN assistance information is unavailable, wherein the second set of thresholds comprise a default set of thresholds preconfigured in the mobile device; and switch the one or more PDN connections of the mobile device from the WLAN to the first WWAN based at least in part on the second set of thresholds.

15. The non-transitory computer-readable medium of claim 14, wherein the second set of thresholds comprises one or more of a connection quality indication (CQI) associated with the WLAN or the first WWAN, an Internet accessibility indication associated with the WLAN or the first WWAN, a signal strength indication associated with the WLAN and/or the first WWAN, and/or a power level associated with the apparatus.

* * * * *